US012456808B2

(12) United States Patent
Adams et al.

(10) Patent No.: US 12,456,808 B2
(45) Date of Patent: Oct. 28, 2025

(54) HIGH ISOLATION RING SLOT PATCH RADIATOR FOR PHASED ARRAY ANTENNAS

(71) Applicant: The Boeing Company, Arlington, VA (US)

(72) Inventors: Alec Adams, Seattle, WA (US); Peter Timothy Heisen, Kent, WA (US); Mark Gregory Bedson, Federal Way, WA (US)

(73) Assignee: The Boeing Company, Arlington, VA (US)

( * ) Notice: Subject to any disclaimer, the term of this patent is extended or adjusted under 35 U.S.C. 154(b) by 54 days.

(21) Appl. No.: 18/542,953

(22) Filed: Dec. 18, 2023

(65) Prior Publication Data

US 2024/0120654 A1 Apr. 11, 2024

Related U.S. Application Data

(63) Continuation-in-part of application No. 17/588,172, filed on Jan. 28, 2022, now Pat. No. 12,255,407.

(Continued)

(51) Int. Cl.
*H01Q 7/00* (2006.01)
*H01Q 21/06* (2006.01)

(52) U.S. Cl.
CPC ............. *H01Q 7/00* (2013.01); *H01Q 21/064* (2013.01)

(58) Field of Classification Search
CPC ............................... H01Q 7/00; H01Q 21/064
See application file for complete search history.

(56) References Cited

U.S. PATENT DOCUMENTS 5,055,852 A 10/1991 Dusseux et al.
6,191,740 B1 2/2001 Kates et al.

(Continued)

FOREIGN PATENT DOCUMENTS

EP 1195080 B1 4/2006
EP 2482383 A2 8/2012

(Continued)

OTHER PUBLICATIONS

R.J. Mailloux, "On the use of metallized cavities in printed slot arrays with dielectric substrates," IEEE Transactions on Antennas and Propagation, May 1987, pp. 477-487.

(Continued)

*Primary Examiner* — Graham P Smith
(74) *Attorney, Agent, or Firm* — Harrity & Harrity, LLP

(57) ABSTRACT

Antenna elements include a metallic square ring patch and a metallic square ring slot to transmit or receive radio frequency (RF) signals. The antenna elements use several dielectric layers that are separated by a low-dielectric foam layer upon which the square ring patch is positioned. The antenna elements may be arranged into an antenna array that is tunable to collectively generate or receive RF signals to and from airborne and mobile vehicles with an agile, electronically scanning antenna array beam, with no moving parts. The antenna array includes a top section to communicate RF signals; a bottom section to generate a desired RF signal; and a foam layer between the top and bottom sections to separate the ring patch from the ring slot. High isolation between the top section and the bottom section allows the antenna elements to be used in higher gain and high-power arrays without adverse feedback issues.

20 Claims, 22 Drawing Sheets

Related U.S. Application Data

(60) Provisional application No. 63/251,582, filed on Oct. 1, 2021.

(56) References Cited

U.S. PATENT DOCUMENTS

| | | | |
|---|---|---|---|
| 6,281,857 | B1 | 8/2001 | Dobrovolny |
| 6,369,759 | B1 | 4/2002 | Epp et al. |
| 6,466,171 | B1 | 10/2002 | Sherman et al. |
| 8,350,771 | B1 | 1/2013 | Zaghloul et al. |
| 8,368,596 | B2 | 2/2013 | Tiezzi et al. |
| 8,773,323 | B1 | 7/2014 | Manry, Jr. et al. |
| 9,742,058 | B1 | 8/2017 | O'Neill, Jr. et al. |
| 9,755,306 | B1 | 9/2017 | Ogilvie |
| 9,819,088 | B2 | 11/2017 | Lai et al. |
| 10,665,934 | B2 | 5/2020 | Hashimoto |
| 2003/0067410 | A1 | 4/2003 | Puzella et al. |
| 2004/0217907 | A1 | 11/2004 | Inoue |
| 2005/0190106 | A1 | 9/2005 | Anguera Pros et al. |
| 2008/0266178 | A1 | 10/2008 | Tiezzi et al. |
| 2010/0126010 | A1 | 5/2010 | Puzella et al. |
| 2011/0025574 | A1 | 2/2011 | Tiezzi et al. |
| 2014/0145891 | A1 | 5/2014 | Palevsky et al. |
| 2015/0084814 | A1 | 3/2015 | Rojanski et al. |
| 2015/0303576 | A1 | 10/2015 | Latrach et al. |
| 2018/0191073 | A1 | 7/2018 | Celik |
| 2019/0089070 | A1 | 3/2019 | Zihir et al. |
| 2020/0021026 | A1 | 1/2020 | Mitchell et al. |
| 2020/0076083 | A1 | 3/2020 | Fukunaga et al. |
| 2020/0335869 | A1 | 10/2020 | Jia |
| 2020/0381842 | A1 | 12/2020 | Milroy et al. |
| 2022/0077583 | A1 | 3/2022 | Jian et al. |
| 2023/0104894 | A1 | 4/2023 | Adams et al. |

FOREIGN PATENT DOCUMENTS

| | | | |
|---|---|---|---|
| RU | 2603530 | C2 | 11/2016 |
| WO | 2016053501 | A1 | 4/2016 |

OTHER PUBLICATIONS

D. Pozar, "A review of aperture coupled microstrip antennas: history operation development and applications", University of Massachusetts at Amherst, May 1996.

R. Caso, A. Buffi, M.R. Pino, P. Nepa, and G. Manara, "A novel dual-feed slotcoupling feeding technique for circularly polarized patch arrays," IEEE Antennas and Wireless Propagation Letters, vol. 9, 2010, pp. 183-186.

R. Caso, A. Buffi, M.R. Pino, P. Nepa, G. Manara, "An annular-slot coupling feeding technique for dual-feed circularly polarized patch arrays," IEEE AP-S International Symposium, Toronto, Ontario, 2010.

J.-S. Row, Design of Aperture-Coupled Annular-Ring Microstrip Antennas for Circular Polarization, IEEE Transactions on Antennas and Propagation, vol. 53, No. 5, May 2005, pp. 1779-1784.

Extended European Search Report, Application No. 22196907.4, Dated Feb. 20, 2023, 7 Pages.

Extended European Search Report for European Application No. EP64648117 dated May 15, 2025, 12 pages.

Gardiol., F.E., et al., "Broadband Patch Antennas—A SSFIP Update", IEEE Antennas and Propagation Society International Symposium 1996 Digest. Baltimore. Held in conjunction with the USNC/URSI National Radio Science Meeting; IEEE Antennas and Propagation Society International Symposium, New York, Jul. 21, 1996,XP000782134, ISBN: 978-0-7803-3217-1, pp. 2-5.

Hercovici, N.I., et al., "A Microstrip Array 1-15 Fed by a New Type of Multilayer Feeding Network", Microwave Journal, Horizon House Publications, Norwood, MA, US, vol. 38(7), Jul. 1, 1995, XP000524894, ISSN: 0192-6225 * pp. 124-134.

Herscovici., NI., et al., "A Microstrip Array Fed by a Non-homogeneous Stripline Feeding Network", IEEE Antennas and Propagation Society International Symposium Digest. Newport Beach. Held in conjunction with the USNC/URSI National Radio Science Meeting, N, vol. 1, Jun. 18, 1995, XP000586892, ISBN: 978-0-7803-2720-7 pp. 586-589.

Las-Heras, F., et al., "Design and Measurement of Low-cost Sector Pattern Antennas", IEE Proceedings: Microwaves, Antennas and Propagation, IEE, Stevenage, Herts, GB, vol. 147(5), Oct. 1, 2000, XP001030352, ISSN: 1350-2417, DOI: 10. IP-map: 20000703, pp. 407-411.

900

1000

2200

HIGH ISOLATION RING SLOT PATCH RADIATOR FOR PHASED ARRAY ANTENNAS

CROSS-REFERENCE TO RELATED APPLICATIONS

This application claims priority to U.S. Provisional Application Ser. No. 63/251,582 entitled "LOW COST ELECTRONICALLY SCANNING ANTENNA ARRAY ARCHITECTURE" and filed on Oct. 1, 2021, and U.S. patent application Ser. No. 17/588,172 entitled "LOW COST ELECTRONICALLY SCANNING ANTENNA ARRAY ARCHITECTURE" and filed on Jan. 28, 2022, which are both incorporated herein by reference in their entirety.

TECHNICAL FIELD

Examples generally relate to phased array antennas ("PAA") to provide reception and transmission of radio frequency (RF) signals. More particularly, the examples relate to low-cost PAAs that provide high isolation between an antenna feed structure and an RF distribution layer.

BACKGROUND

A phased array antenna ("PAA") is a type of antenna that includes a plurality of sub-antennas (generally known as antenna elements, array elements, or radiating elements of the combined antenna) in which the relative amplitudes and phases of the respective signals feeding the array elements may be varied in a way that the effect on the total radiation pattern of the PAA is reinforced in desired directions and suppressed in undesired directions. In other words, a beam may be generated that may be pointed in or steered into different directions. Beam pointing in a transmit or receive PAA is achieved by controlling the amplitude and phase of the transmitted or received signal from each antenna element in the PAA.

The individual radiated signals are combined to form the constructive and destructive interference patterns produced by the PAA that result in one or more antenna beams. The PAA may then be used to point the beam, or beams, rapidly in azimuth and elevation.

Some existing solutions, however, provide relatively low isolation between an antenna element or antenna feed structure and a radio frequency (RF) distribution element or distribution layer. These configurations may suffer feedback issues when size (e.g., number of elements) and power of the antenna array is increased. As a result, there exists a need for PAAs that provide high isolation between an antenna feed structure and an RF distribution layer.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

The disclosed examples and implementations are directed to antenna elements that may be positioned together to form an antenna array (or PAA). The disclosed antenna elements use a number of stacked dielectric layers, at least two of which are separated by a low-dielectric foam layer. A horizontal top dielectric layer supports a microstrip square ring patch radiator and also serves as an environmental shield against corrosion. A square ring patch cutout hole reduces the resonance frequency of the patch and allows a smaller outside diameter which is desirable for mutual coupling reduction and avoidance of over-emphasis of broadside antenna gain.

The disclosed antenna elements may be arranged together in an antenna array that is tunable to collectively generate or receive RF signals. In particular, the antenna array functions as a 256-element transmit/receive half-duplex antenna, operating in transmit or receive mode at any time, but not at the same time. The antenna array includes a radiator block, a transmit/receive (T/R) amplifier block, a beamformer block, and a distribution network block.

Other disclosed examples and implementations are directed to a unit cell antenna system for a periodic antenna array, the system comprising a top section to communicate a radio frequency (RF) signal, the top section including a dielectric layer, and a ring patch, wherein the ring patch is supported by the dielectric layer, the ring patch having a center cutout hole to reduce a resonance frequency of the ring patch; a bottom section to generate a desired radio frequency (RF) signal, the bottom section including a plurality of dielectric layers; a ring slot supported by one of the plurality of dielectric layers; an electrically conductive fence substantially surrounding the ring slot; two electrical feed lines, wherein the electrical feed lines are 90-degrees out of phase; and a foam layer disposed between the top section and the bottom section, the foam layer to separate the ring patch from the ring slot.

Still other disclosed examples and implementations are directed to a method for providing a unit cell antenna for a periodic antenna array, the method comprising providing a top section to communicate a radio frequency (RF) signal, the top section including a dielectric layer, and a ring patch, wherein the ring patch is supported by the dielectric layer, the ring patch having a center cutout hole to reduce a resonance frequency of the ring patch; providing a bottom section to generate a desired radio frequency (RF) signal, the bottom section including a plurality of dielectric layers; a ring slot supported by one of the plurality of dielectric layers; an electrically conductive fence substantially surrounding the ring slot; two electrical feed lines, wherein the electrical feed lines are 90-degrees out of phase; and providing a foam layer disposed between the top section and the bottom section, the foam layer to separate the ring patch from the ring slot.

Other further disclosed examples and implementations are directed to a method of fabricating a unit cell antenna system for a periodic antenna array, the method comprising forming a top section to communicate a radio frequency (RF) signal, the top section including a dielectric layer, and a ring patch, wherein the ring patch is supported by the dielectric layer, the ring patch having a center cutout hole to reduce a resonance frequency of the ring patch; forming a bottom section to generate a desired radio frequency (RF) signal, the bottom section including a plurality of dielectric layers; a ring slot supported by one of the plurality of dielectric layers; an electrically conductive fence substantially surrounding the ring slot; two electrical feed lines, wherein the electrical feed lines are 90-degrees out of phase; and forming a foam layer disposed between the top section and the bottom section, the foam layer to separate the ring patch from the ring slot.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Corresponding reference characters indicate corresponding parts throughout the accompanying drawings.

DETAILED DESCRIPTION

Figure 1:
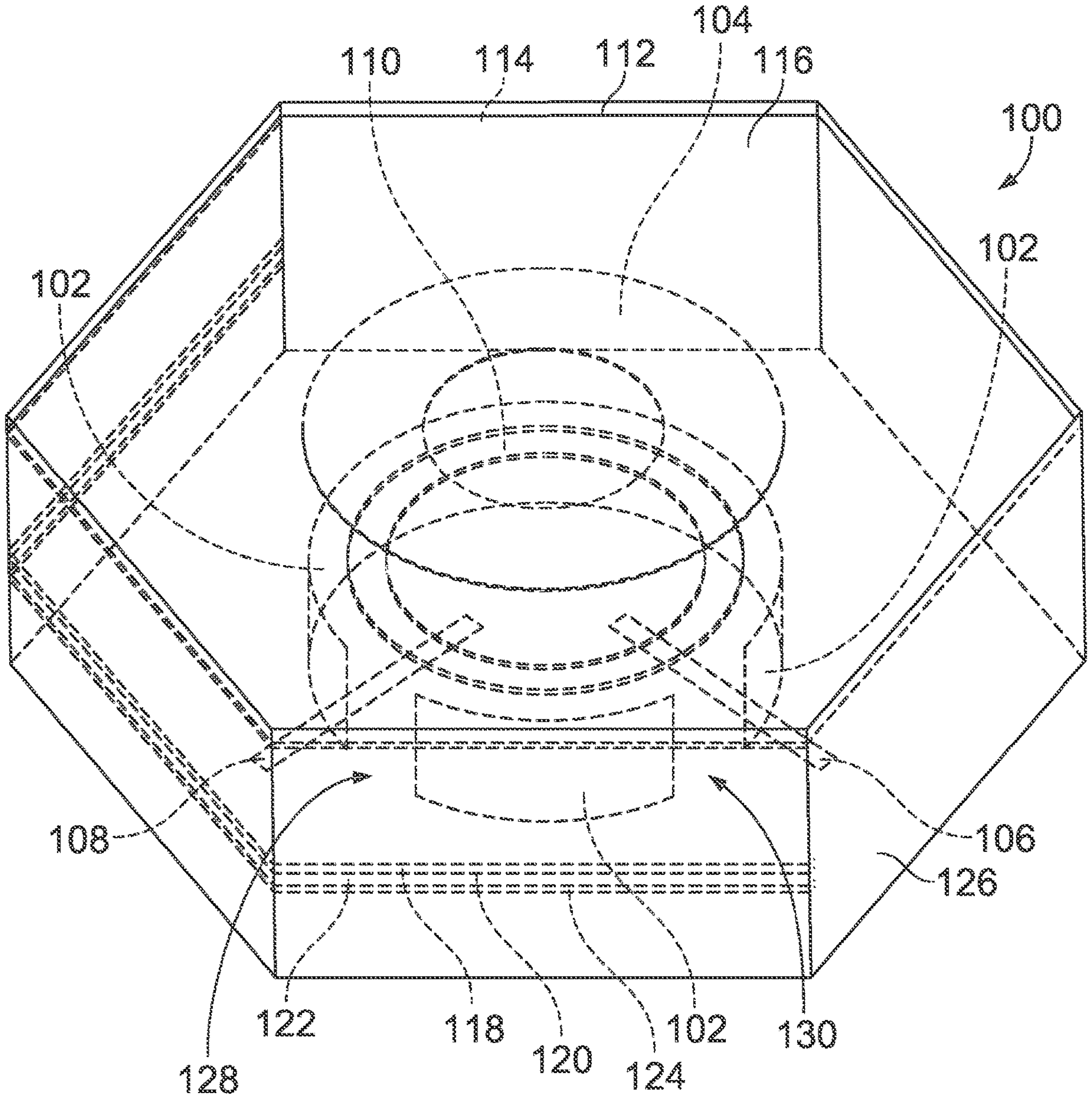
FIG. 1 illustrates a perspective view of a ring cell with an electrically conductive fence, according to some of the disclosed implementations.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

A phased array antenna (PAA) includes multiple emitters and is used for beamforming in high-frequency RF applications, such as in radar, 5G, or myriad other application. The number of emitters in a PAA can range from a few into the thousands. The goal in using a PAA is to control the direction of an emitted beam by exploiting constructive interference between two or more radiated signals. This is known as "beamforming" in the antenna community.

More specifically, a PAA enables beamforming by adjusting the phase difference between the driving signal sent to each emitter in the array. This allows the radiation pattern to be controlled and directed to a target without requiring any physical movement of the antenna. This means that beamforming along a specific direction is an interference effect between quasi-omnidirectional emitters (e.g., dipole antennas).

The disclosed implementations and examples provide a low-cost Ku-Band electronically-scanning antenna array architecture integrating one or more low-complexity apertures, coupled hybrid patch radiators, and commercial monolithic microwave integrated circuits (MMICs) with a low-cost multilayer printed wiring board design known as an antenna integrated printed wired assembly (AIPWA). More specifically, a ring-shaped antenna element (referred to herein as a "ring cell") is described that provides an ultra-low-cost unit cell antenna element with unique feed structure for an electronically scanning array. The ring element circuit board-like sections and low-dielectric spacers, such as a foam or core structure. A top section of the antenna element includes a layer of dielectric substrate to support a microstrip ring patch radiator. A bottom section has one layer of dielectric substrates to support a ring slot and dual feed lines. The disclosed antenna elements provide high-quality antenna performance over wide frequency bandwidth and up to +/−45 deg 1D scan range as well as dual-linear polarizations and circular polarization.

The ring cells include a unique feed structure for a PAA or other electronically scanning array. The ring cell is composed of circuit board-based sections and a foam spacer. The top section has one layer of dielectric substrate to support a microstrip ring patch radiator. The bottom section has two layers of dielectric substrates to support a ring slot, dual feed lines, and a metallic fence. The disclosed ring cells offer high-quality antenna performance over wide frequency bandwidth and large scan volume. The ring cells also provide dual-linear polarizations or circular polarizations. The disclosed ring cell does not use mechanically moving parts, eliminating much of the complexity and failure points of conventional antenna cells.

The disclosed ring cells may be arranged in an array antenna (e.g., a PAA) that includes multiple ring cells that collectively function as an electronically scanning antenna array beam. Array antennas using the disclosed ring cells may be used in a multitude of real-world applications. For example, airplanes, motorized vehicles, various military systems, Internet of Things (IoT) devices, and any devices that use RF signaling may be equipped with array antennas that use the disclosed ring cells. The disclosed ring cells and antenna arrays provide electronically scanning antenna systems that dramatically reduce both integration costs due to the low-profile design and the use of affordable off-the-shelf materials.

Traditionally, ceramic chip carrier modules are used to interface MMICs with an AIPWB. Such ceramic packages are relatively expensive and require costly manual labor to assemble. Not only that, but the ceramic packages also use bulky and complex waveguide radiators that add lamination steps and extra layers to the AIPWB. The waveguide radiators require a costly and complex wide angle impedance matching (WAIM) structure as an interface between the antenna array and free space. Unfortunately, this does not meet the cost per element targets for many line-of-sight communication customers.

The disclosed implementations and examples use low-complexity aperture coupled patch radiators, low-cost commercial-off-the-shelf surface mount MMICs, and a low-cost multilayer printed wiring board stack-up. The low-complexity aperture coupled patch radiators reduce the AIPWB layer count by 50% and remove the WAIM component, without sacrificing antenna RF performance within +/−45-degree elevation scan. The use of low-cost commercial-off-the-shelf MMICs with surface mount integration reduces the cost-per-element of the antenna array by more than a factor of three. The low-cost and reduced complexity multilayer printed wiring board stack-up reduces fabrication costs and opens fabrication to a more diverse supplier base.

The disclosed ring cells are able to send or receive RF signals to and from vehicles and aircraft with an agile electronically-scanning antenna array beam without mechanical moving parts. The antenna elements may be assembled into an antenna array that may be used in a host of applications, such as, for example but without limitation, for radar, sensor, or other applications. The antenna elements provide a high-performance, light-weight, low-profile, and ultra-low-cost solution to meet challenging and evolving mission requirements. Moreover, the disclosed antenna elements are used in the fabrication of integrated and structurally-integrated antennas, specifically in composite sandwich panels due to the minimal use of through-depth vias and connections.

FIG. 1 illustrates a perspective view of a ring cell 100 with an electrically conductive fence 102 ("ring fence" 102), according to some of the disclosed implementations. The ring cell 100 comprises a number of circuit board-based sections. In addition to the electrically conductive fence 102, the ring cell 100 includes a ring patch 104, two electrical feed lines 106 and 108, a ring slot 110, a top dielectric layer 112, a top adhesive layer 114, a foam layer 116, an upper internal adhesive layer 118, an internal metal layer 120, a middle dielectric layer 122, and a bottom dielectric layer 122. In some implementations, the foam layer 116 comprises a foam layer that separates the ring patch 104 from the ring slot 110, and is thus referred to herein as the "foam layer" 116. In some examples, the various dielectric layers 112, 122, and 126 are printed circuit boards (PCBs). Moreover, the ring patch 104 may be formed, etched, or adhered to the foam layer 114 to hold the ring patch 104 in place.

The electrically conductive fence 102 includes one or more metallic (or otherwise conductive) walls. An alternative design shown in FIG. 4 replaces the metallic walls with a circular pattern of electrical vias.

More specifically, the horizontal top section of the ring cell 100 includes the top dielectric layer 112 that supports the ring patch 104 below and also serves as an environmental shield against corrosion. The ring patch 104 includes a cutout hole that reduces the resonance frequency of the patch and allows a smaller outside diameter, which is desirable for mutual coupling reduction and avoidance of over-emphasis of broadside antenna gain.

The bottom section of the ring cell 100 includes two layers of dielectric substrates, the middle dielectric layer 122 and the bottom dielectric layer 126, that collectively support the ring slot 110, dual feed lines 106 and 108, and the thin electrically conductive fence 102. The feed lines 106 and 108 provide electrical supply that excite orthogonal resonant modes in the ring slot 110, which, in turn excites orthogonal resonant modes in the ring patch 104 above for RF signaling. When transmitting RF signals, the electrical feed lines supply the electrical supply (voltage and current) to generate electrical resonance in the ring 110 that, then, generates the desired RF signal in the ring patch 104. When receiving RF signals, the electrical feed lines receive electrical supply induced in the ring 110 from the ring patch 104 receiving an RF signal.

The ring slot 110 and the ring patch 104 work together to provide a wider impedance bandwidth than either one alone could provide. The ring cell 100 is thus designed to operate as a hybrid radiator, working in both transmit and receive modes. Alternatively, the ring cell 100 may operate in just transmit or in just receive mode.

The electrically conductive fence 102 shields the ring slot 110 from an RF power distribution network and reduces unwanted mutual coupling with other ring slots 110 in neighboring ring cells 100 that are part of an array antenna (e.g., a PAA). The diameter and depth of the electrically conductive fence 102 are set so that the ring slot 110 resonates at or near the desired operating frequency band. In some implementations, openings 128 and 130 around the electrically conductive fence 102 allow the feed lines 106 and 108 to go inside without being electrically shorted.

The ring patch 104 and electrically conductive fence 102 are metallic or otherwise electrically conductive. Electricity is supplied to the ring cell 100 through the feed lines 106 and 108, causing the ring fence 102 and ring patch 104 to operate as a radiating element for generating specific RF signals. Shape-wise, the electrically conductive fence 102 has a larger diameter than the ring slot 110. This allows the ring slot 110 to be positioned, horizontally, inside the electrically conductive fence 102. Though, as can be seen in FIG. 2, the ring slot 110 is positioned vertically above the electrically conductive fence 102, at least in some implementations.

Figure 5A:
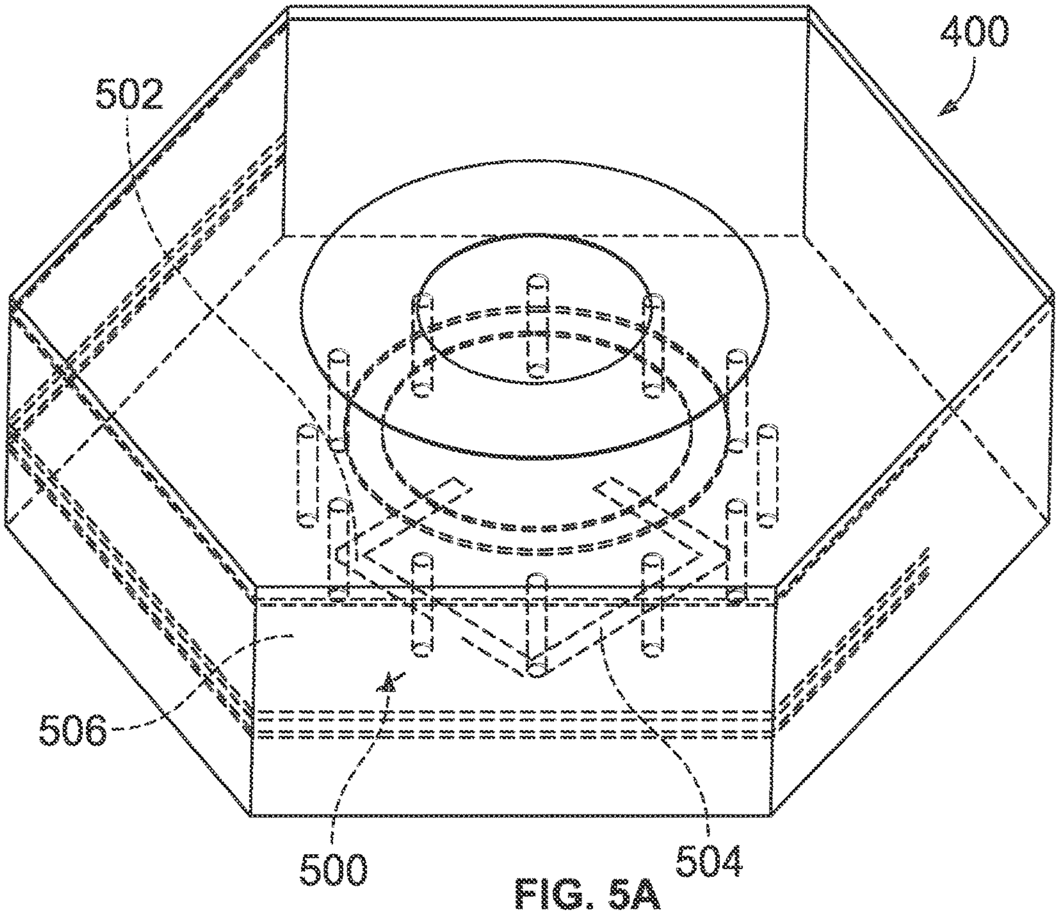
FIGS. 5A and 5B illustrate perspective and top views, respectively, of a ring cell with a T-junction delay feed line, according to some of the disclosed implementations.
Figure 5B:
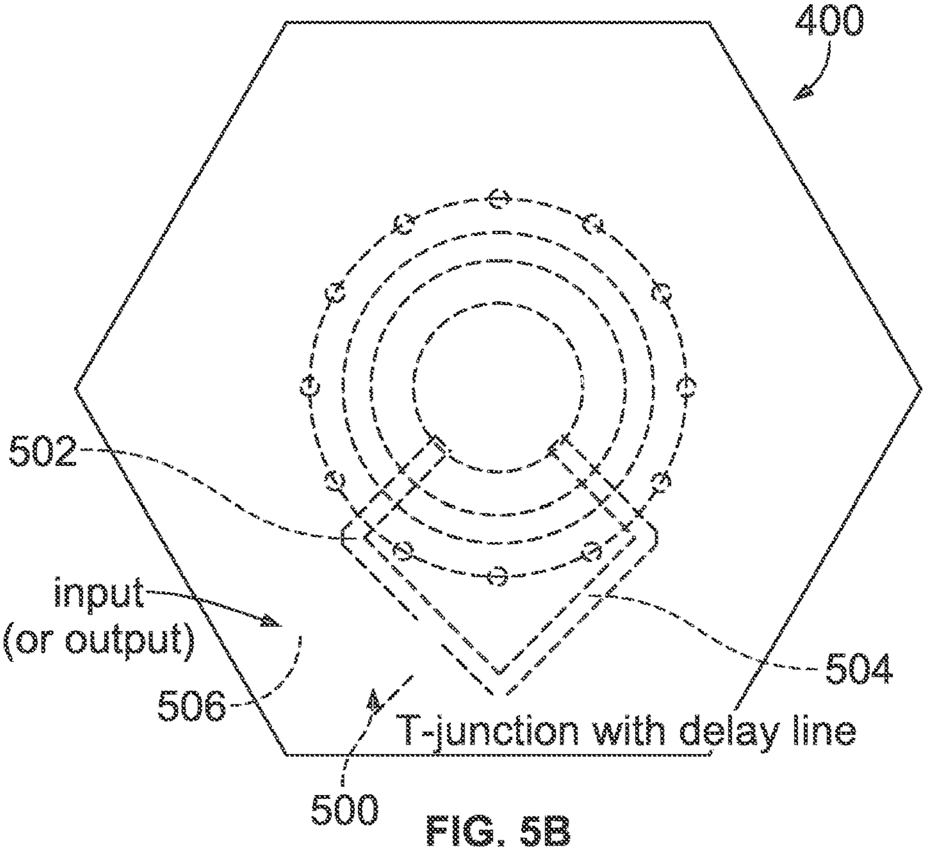
Figure 6A:
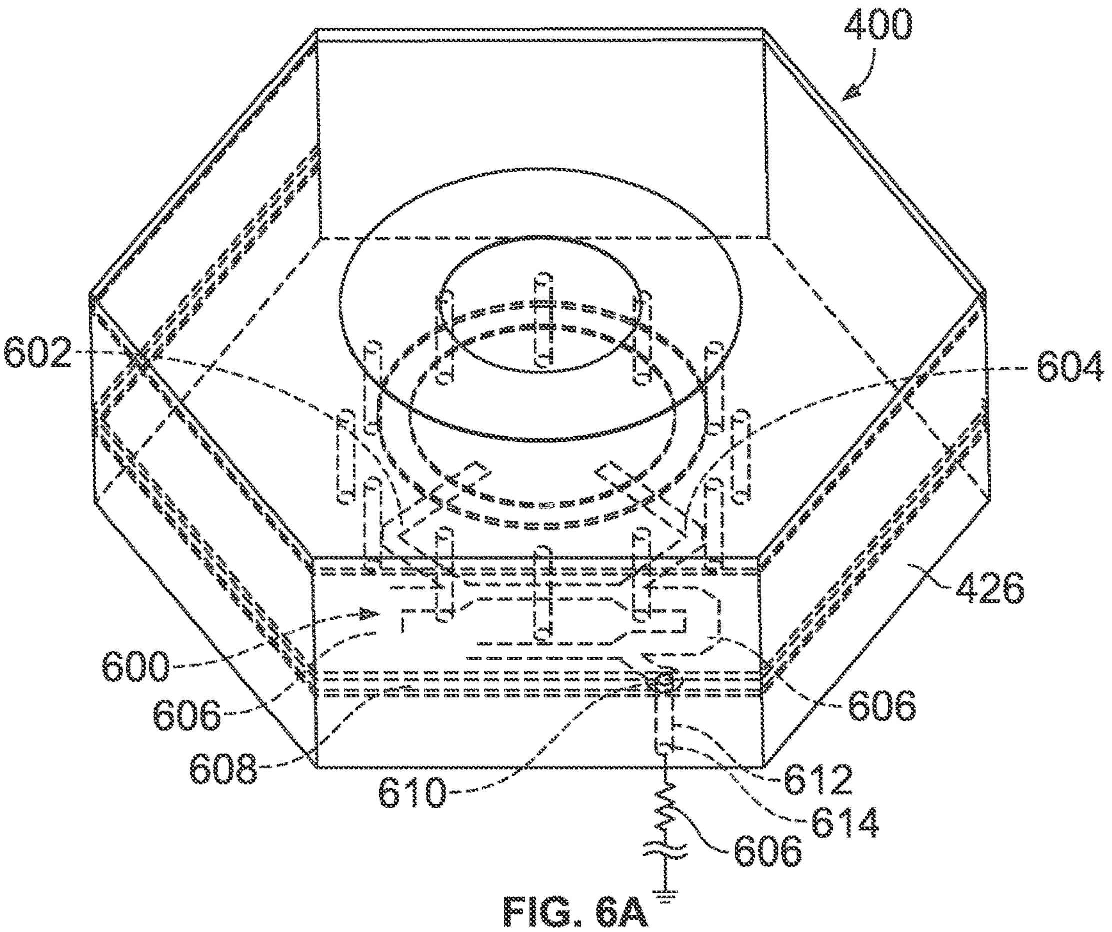
FIGS. 6A and 6B illustrate perspective and top views, respectively, of a ring cell with a 90-degree hybrid coupler, according to some of the disclosed implementations.
Figure 6B:
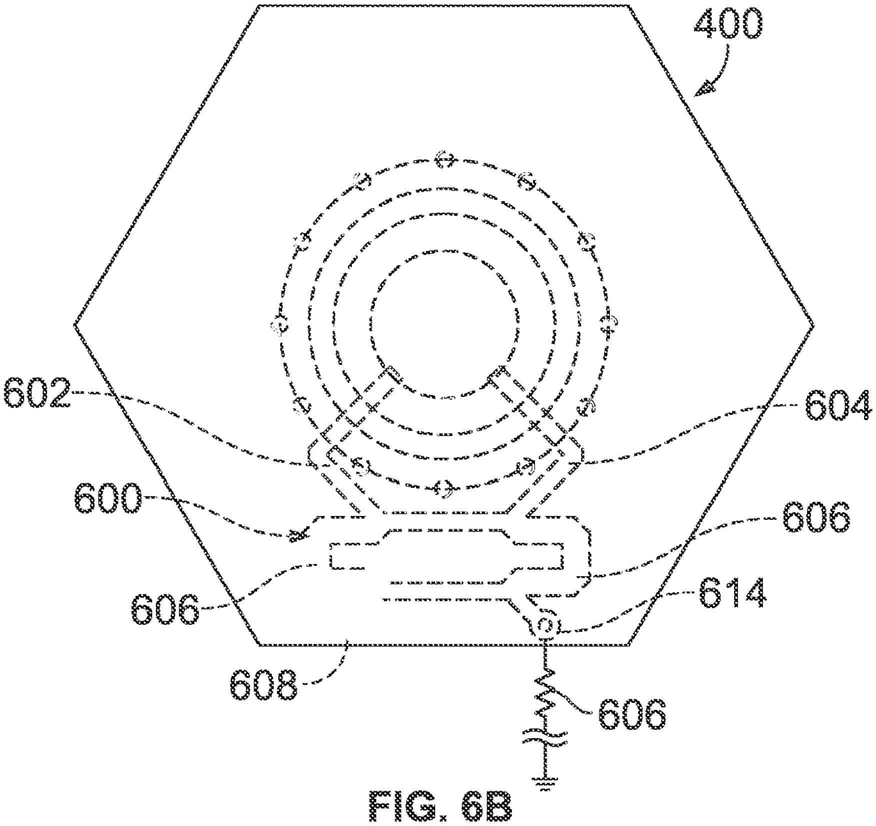

The dual electrical feed lines 106 and 108 excite orthogonal dual-linear polarizations necessary for some applications. For other applications, a dual or single circular polarization may be required. Alternatively, some implementations include a feed structure using a T-junction divider/combiner (transmit/receive, respectively) and a 90-degree delay line for right-hand circular polarization, which is shown in FIGS. 5A and 5B. This integrated co-planar feed provides an economical way to achieve optimal polarization performance in the far-field. Left-hand circular polarization can also be realized by moving the L-shaped input line section from the current position to the other side of the V-shaped junction. For improved circular polarization performance over scan, other implementations use a different feed structure that uses a 90-degree hybrid coupler, which is shown in FIGS. 6A and 6B.

The illustrated ring cells 100 disclosed herein are shaped in a hexagonal pattern. Yet, other shapes are fully contemplated as well. For instance, the ring cell 100 may be circular, rectangular, square, or the like. In these non-hexagonal shaped ring cells 100, some implementations still use a circular ring patch 104, ring slot 110, and electrically conductive fence 102.

Figure 2:
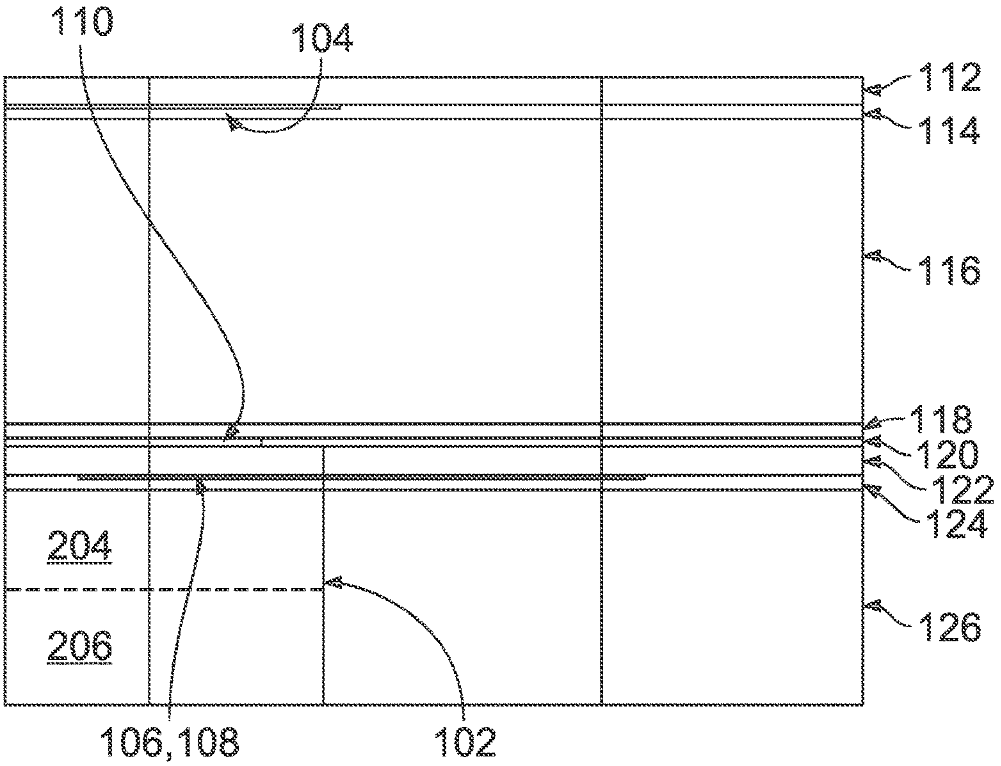
FIG. 2 illustrates a cut-out side view of a ring cell with an electrically conductive fence, according to some of the disclosed implementations.

FIG. 2 illustrates a cut-out side view of the ring cell 100 with the electrically conductive fence 102, according to some of the disclosed implementations. As depicted, the ring patch 104 is positioned atop the top adhesive layer 114 and below the dielectric layer 112. The foam layer 116 separates the top adhesive layer 114 from the ring slot 110. Specifically, the foam layer 116 is positioned between the top adhesive layer 114 and the upper internal adhesive layer 118. The ring slot 110 is situated within the internal metal layer 120. The electrically conductive fence 102 spans across the middle dielectric layer 122, the lower adhesive layer 124, and the bottom dielectric layer 126.

The disclosed example shows the feed lines 106 and 108 being positioned vertically in the upper half of the electrically conductive fence 102. Dotted line 202 shows the vertical middle of the electrically conductive fence 102. As can be seen, the feed lines 106 and 108 are positioned in upper half 204, instead of in lower half 206.

Figure 3:
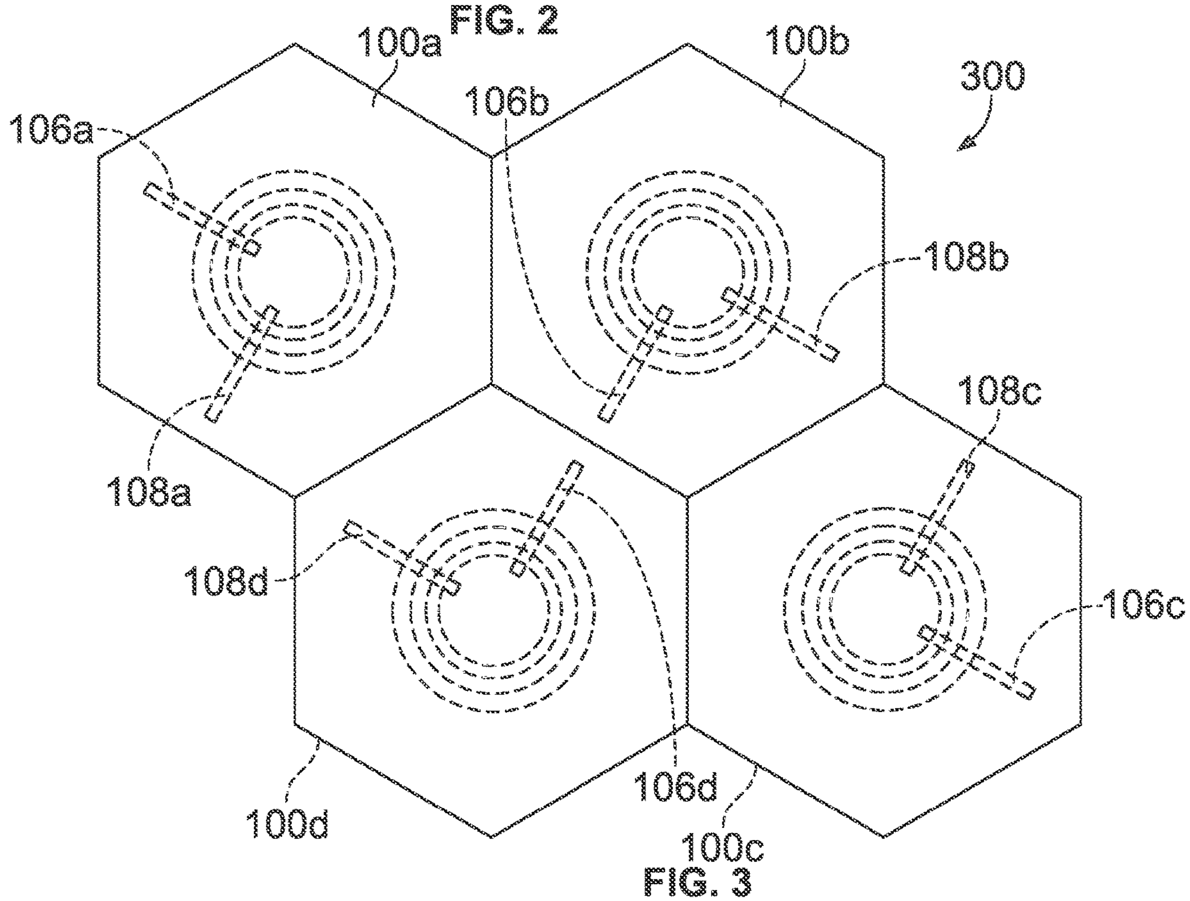
FIG. 3 illustrates a top view of an antenna array made up of multiple ring cells, according to some of the disclosed implementations.

FIG. 3 illustrates a top view of an antenna array 300 made up of multiple ring cells 100*a-d*, according to some of the disclosed implementations. This illustration shows one example where electrical feed lines 106*a-d* and 108*a-d* of the various ring cells 100*a-d* with a 90-degree rotation. In other words, feed lines 106*a* and 108*a* are rotated 90 degrees from the positions of feed lines 106*b* and 108*b*. This positioning suppresses undesirable cross-polarization signal level in the far-field.

An alternative design that does not use the electrically conductive fence 102 is shown in FIGS. 4-6B. Instead of an electrically conductive fence, these alternative implementations form a circular fence using a collection of electrical vias.

Figure 4:
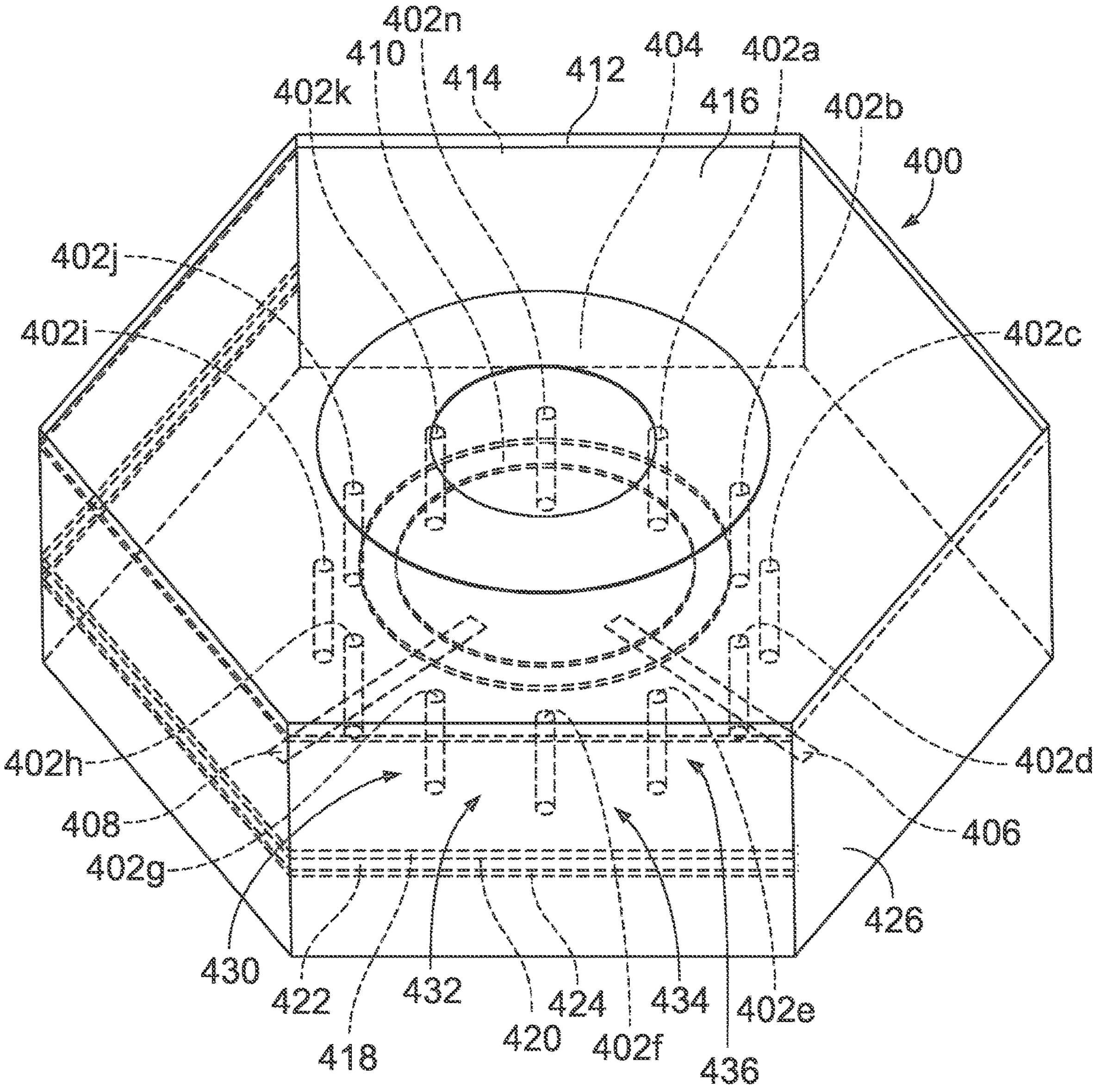
FIG. 4 illustrates a perspective view of a ring cell with a circular via fence, according to some of the disclosed implementations.

Along these lines, FIG. 4 illustrates a perspective view of a ring cell 400 with a circular via fence 402, according to some of the disclosed implementations. The ring cell 400 a ring patch 404, two electrical feed lines 406 and 408, a ring slot 410, a top dielectric layer 412, a top adhesive layer 414, a foam layer 416, an upper internal adhesive layer 418, an internal metal layer 420, a middle dielectric layer 422, and a bottom dielectric layer 422. These various components are positioned in the same manner previously discussed ring cell 100. Yet, instead of the electrically conductive fence 102, the ring cell 400 includes electrical vias 402*a-n* that are positioned in a circular pattern around the ring slot 410, collectively forming a via fence with numerous openings 430-436 (though, only four openings are labeled).

Like the ring cell 100, the horizontal top section of the ring cell 400 includes the top dielectric layer 412 that supports the ring patch 404 below and also serves as an environmental shield against corrosion. The ring patch 404 includes a cutout hole that reduces the resonance frequency of the patch and allows a smaller outside diameter, which is desirable for mutual coupling reduction and avoidance of over-emphasis of broadside antenna gain.

The bottom section of the ring cell 400 includes two layers of dielectric substrates, the middle dielectric layer 422 and the bottom dielectric layer 426, that collectively support the ring slot 410, dual feed lines 406 and 408, and the via fence formed by the electrical vias 402*a-n*. The feed lines 406 and 408 excite orthogonal resonant modes in the ring slot 410, which, in turn excites orthogonal resonant modes in the ring patch 404 above. The ring slot 410 and the ring patch 404 work together to provide a wider impedance bandwidth than either one alone could provide. The ring cell 400 is thus designed to operate as a hybrid radiator, working in both transmit and receive modes. Alternatively, the ring cell 400 may operate in just transmit or in just receive mode.

The ring patch 404 and electrically electrical vias 402*a-n* are metallic or otherwise electrically conductive. Electricity is supplied to the ring cell 400 through the feed lines 406 and 408, causing the electrical vias 402*a-n* and ring patch 404 to operate as a radiating element for generating specific RF signals. Shape-wise, the via fence has a larger diameter than the ring slot 410. This allows the ring slot 410 to be positioned, horizontally, inside the electrically conductive fence 402.

The via fence created by the electrical vias 402*a-n* also shield the ring slot 410 from a power distribution network and reduce unwanted mutual coupling with other ring slots 410 in neighboring ring cells 400 that are part of an array antenna (e.g., a PAA). The diameter and depth of the via fence are set so that the ring slot 410 resonates at or near the desired operating frequency band. In some implementations, the openings around the electrical vias conductive fence 102 allow the feed lines 106 and 108 to go inside without being electrically shorted.

The feed lines 406 and 408 being positioned vertically in the upper half of the electrical vias 402*a-n*.

FIGS. 5A and 5B illustrate perspective and top views, respectively, of the ring cell 400 with a T-junction delay feed line 500, according to some of the disclosed implementations. The T-junction delay feed line 500 includes two feed lines (shorter feed line 502 and longer L-shaped feed line 504) that extend out from a single input/output (I/O) line 506. Feed line 504 is longer than feed line 502 for circular polarization formation in the RF signals emitted or received through the ring cell 400. These separate feed lines 504 and 506 are positioned 90-degrees from each other. While ring cell 400 design with electrical vias 402*a-n* is shown, the T-junction delay feed line 500 may be used in the ring cell 100 with the electrically conductive fence 102.

The depicted T-junction delay feed line 500 provides right-hand circular polarization, supplying optimal polarization in the far-field. Left-hand circular polarization may also be realized by moving the longer L-shaped feed line 504 from the illustrated position to the other side of the V-shaped junction.

The depicted T-junction delay feed line 500 may also be used in the ring cell 100, instead of the depicted ring cell 400. Ring cell 400 is only shown in FIGS. 5A-5B as one example of a ring cell with the T-junction delay feed line 500.

FIGS. 6A and 6B illustrate perspective and top views, respectively, of the ring cell 400 with a 90-degree hybrid coupler 600, according to some of the disclosed implementations. The hybrid coupler 600 includes two feed lines 602 and 604 and an ellipsoidal (or circular) path line 906. In some implementations, feed lines 604 and 606 are positioned 90-degrees from each other. The hybrid coupler 600 includes two terminal ends 608 and 610. End 608 acts as an input or output of voltage supply, depending on whether the ring cell is transmitting or receiving RF signals. End 610 is connected to an electrical via 612 that spans through the bottom dielectric layer 426 and is electrically coupled to a resistor 614. In operation, this hybrid coupler 600 provides improved circular polarization performance.

The depicted hybrid coupler 600 may also be used in the ring cell 100, instead of the depicted ring cell 400. Ring cell 400 is only shown in FIGS. 6A-6B as one example of a ring cell with the hybrid coupler 600.

Figure 7:
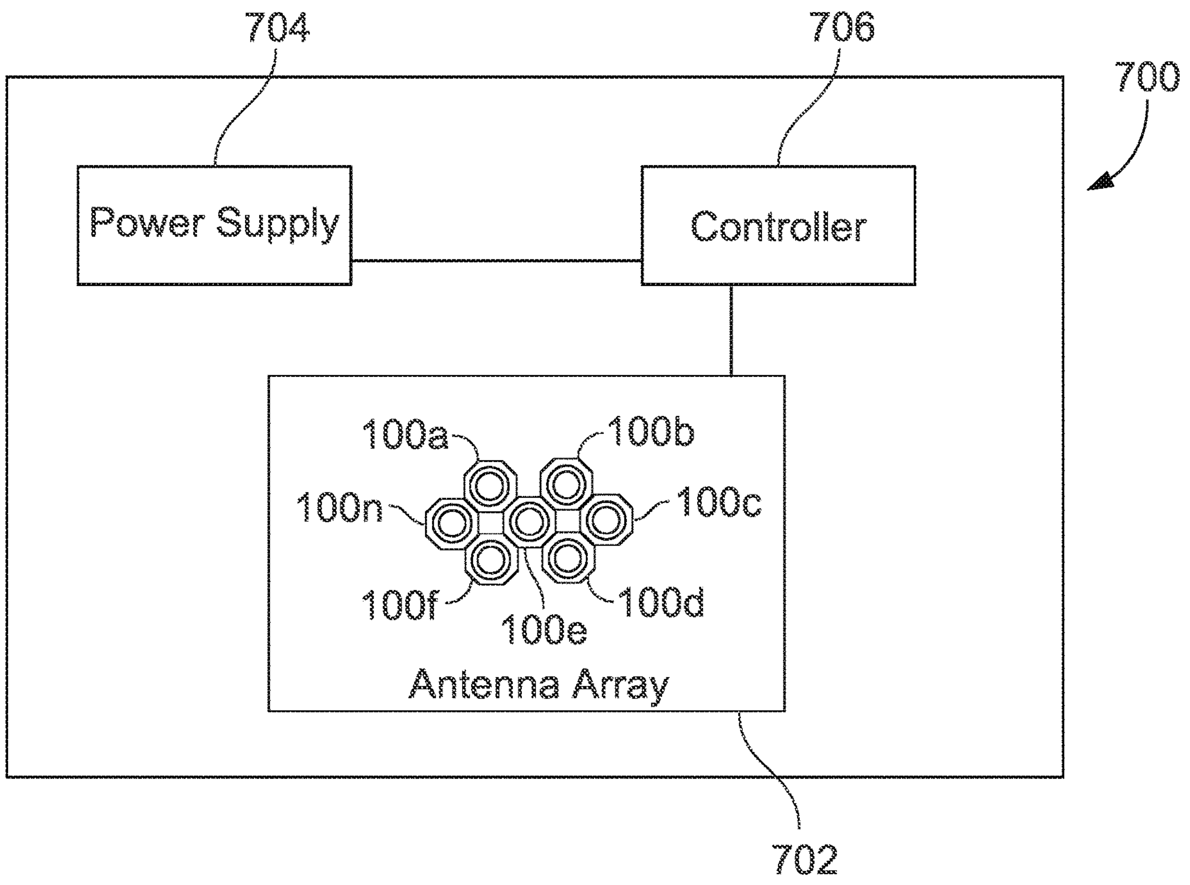
FIG. 7 illustrates a block diagram of an antenna system for an antenna array made up of the disclosed ring cells in this disclosure.

FIG. 7 illustrates a block diagram of an antenna system 700 for an antenna array 702 made up of the disclosed ring cells 100*a-n* in this disclosure. In this example, the antenna system 700 includes a power supply 702, a controller 704, and the antenna array 702. In this example, the antenna array 702 is a phased array antenna ("PAA") that includes a plurality of the ring cells 102*a-n* that operate either transmit and/or receive modules. Ring cells 100*a-n* include corresponding radiation elements that in combination are capable of transmitting and/or receiving RF signals. For example, the ring cells 100*a-n* may be configured to operate within a K-band frequency range (e.g., about 20 GHz to 40 GHz for NATO K-band and 18 GHz to 26.5 GHz for IEEE K-band).

The power supply 704 is a device, component, and/or module that provides power to the controller 706 in the antenna system 700. The controller 706 is a device, component, and/or module that controls the operation of the antenna array 702. The controller 706 may be a processor, microprocessor, microcontroller, digital signal processor ("DSP"), or other type of device that may either be programmed in hardware and/or software. The controller 706 controls the electrical feed supplies provided to the antenna array 702, including, without limitation calibrating particular polarization, voltage, frequency, and the like of the electrical feeds. Only one line is shown between the controller 706 and the antenna array 702 for the sake of clarity, but in reality, several electrical connections and supply lines may connect the controller 706 to the antenna array 702.

In some implementations, the controller 706 supplies the particular electrical feeds to the various ring cells 100*a-n* in order to create numerous RF signals that combine, either constructively or destructively, to form a desired cumulative RF signal for transmission.

RF signals emitted from each ring cell 100*a-n* in the array antenna 702 may be in phase so as to constructively produce intense radiation or out of phase to destructively create a particular RF signal. Direction may be controlled by setting the phase shift between the signals sent to different ring cells 100*a-n*. The phase shift may be controlled by the controller 706 placing a slight time delay between signals sent to successive ring cells 100*a-n* in the array.

The antenna system 700 is described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

This antenna system 700 provides a means to send (or receive) RF signals to (or from) airborne/mobile vehicles with an agile electronically scanning antenna array beam without mechanical moving parts. The antenna system 700 can be used in communications systems and other applications, including, without limitation, for radar/sensor, electronic warfare, military applications, mobile communications, and the like. The antenna system 700 provides a high-performance, light-weight, low-profile and affordable solution to meet challenging and evolving mission requirements.

Figure 8:
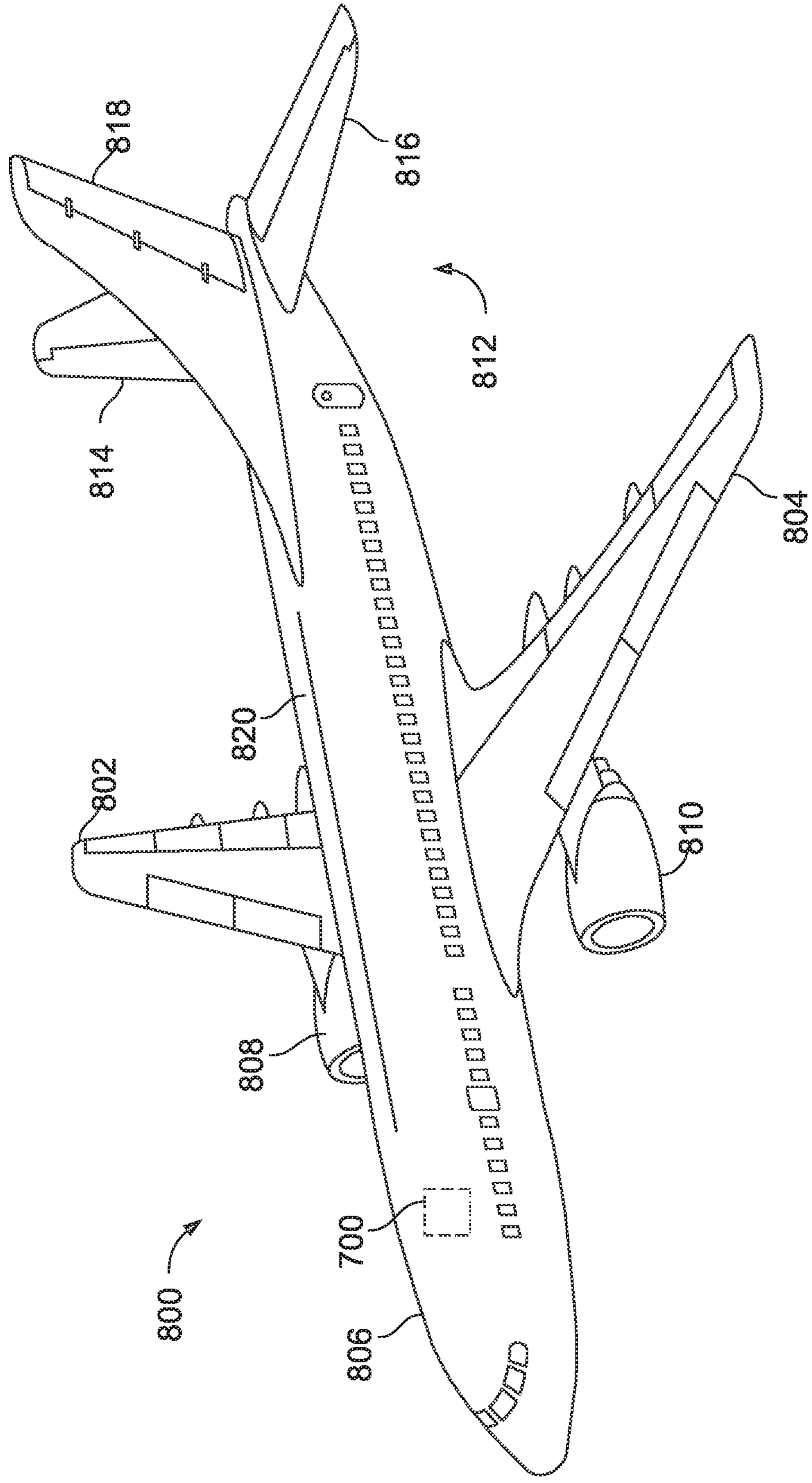
FIG. 8 illustrates a perspective view of an aircraft having one or more array antennas made up of the disclosed ring cells in this disclosure.

FIG. 8 illustrates a perspective view of an aircraft having an antenna array 702 according to various implementations of the present disclosure. The aircraft 800 includes a wing 802 and a wing 804 attached to a body 806. The aircraft 800 also includes an engine 808 attached to the wing 802 and an engine 810 attached to the wing 804. The body 806 has a tail section 812 with a horizontal stabilizer 814, a horizontal stabilizer 816, and a vertical stabilizer 818 attached to the tail section 812 of the body 806. The body 806 in some examples has a composite skin 820.

In some examples, the previously discussed antenna system 700, which includes the disclosed ring cells 100 in an antenna array 702 or just the ring cells 100 individually, may be included onto or in the aircraft 800. This is shown in FIG. 8 with a dotted box. The antenna system 700 may be positioned inside or outside of the aircraft 700.

The illustration of the aircraft 800 is not meant to imply physical or architectural limitations to the manner in which an illustrative configuration may be implemented. For example, although the aircraft 800 is a commercial aircraft, the aircraft 800 can be a military aircraft, a rotorcraft, a helicopter, an unmanned aerial vehicle, or any other suitable aircraft. Other vehicles are possible as well, such as, for example but without limitation, an automobile, a motorcycle, a bus, a boat, a train, or the like.

Traditionally, ceramic chip carrier modules are used to interface MMICs with an AIPWB. Such ceramic packages are relatively expensive and require costly manual labor to assemble. Not only that, but the ceramic packages also use bulky and complex waveguide radiators that add lamination steps and extra layers to the AIPWB. The waveguide radiators require a costly and complex wide angle impedance matching (WAIM) structure as an interface between the antenna array and free space. Unfortunately, this does not meet the cost per element targets for many line-of-sight communication customers.

The disclosed implementations and examples use low-complexity aperture coupled patch radiators, low-cost commercial-off-the-shelf surface mount MMICs, and a low-cost multilayer printed wiring board stack-up. The low-complexity aperture coupled patch radiators reduce the AIPWB layer count by 50% and remove the WAIM component, without sacrificing antenna RF performance within +/−45-degree elevation scan. The use of low-cost commercial-off-the-shelf MMICs with surface mount integration reduces the cost-per-element of the antenna array by more than a factor of three. The low-cost and reduced complexity multilayer printed wiring board stack-up reduces fabrication costs and opens fabrication to a more diverse supplier base.

The disclosed ring cells are able to send or receive RF signals to and from vehicles and aircraft with an agile electronically-scanning antenna array beam without mechanical moving parts. The antenna elements may be assembled into an antenna array that may be used in a host of applications, such as, for example but without limitation, for radar, sensor, or other applications. The antenna elements provide a high-performance, light-weight, low-profile, and ultra-low-cost solution to meet challenging and evolving mission requirements. Moreover, the disclosed antenna elements are used in the fabrication of integrated and structurally-integrated antennas, specifically in composite sandwich panels due to the minimal use of through-depth vias and connections.

Figure 9:
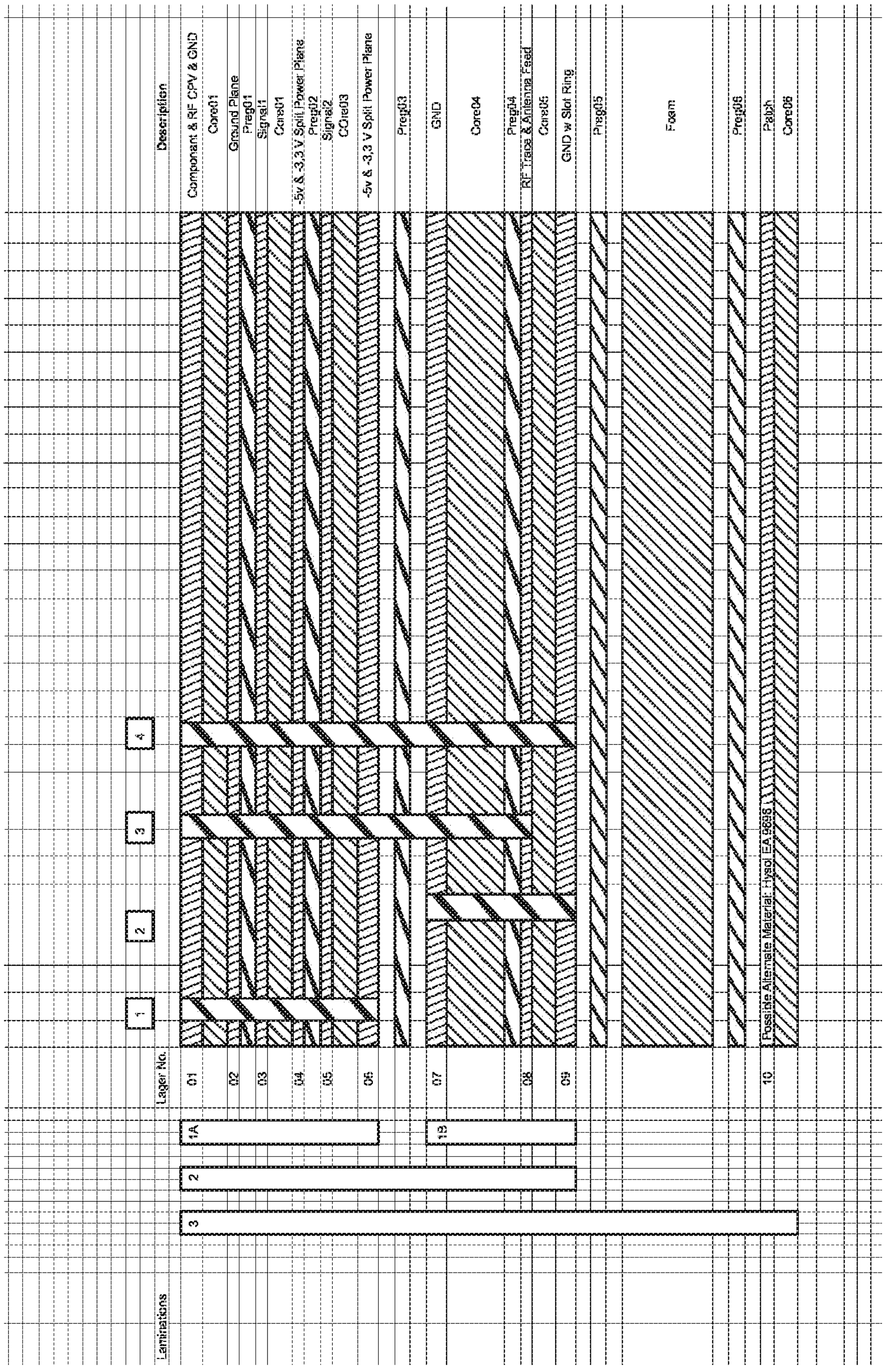
FIG. 9 illustrates an antenna integrated printed wiring board (AIPWB) for an antenna array that is built with several ring cells, according to some of the disclosed implementations.
Figure 10:
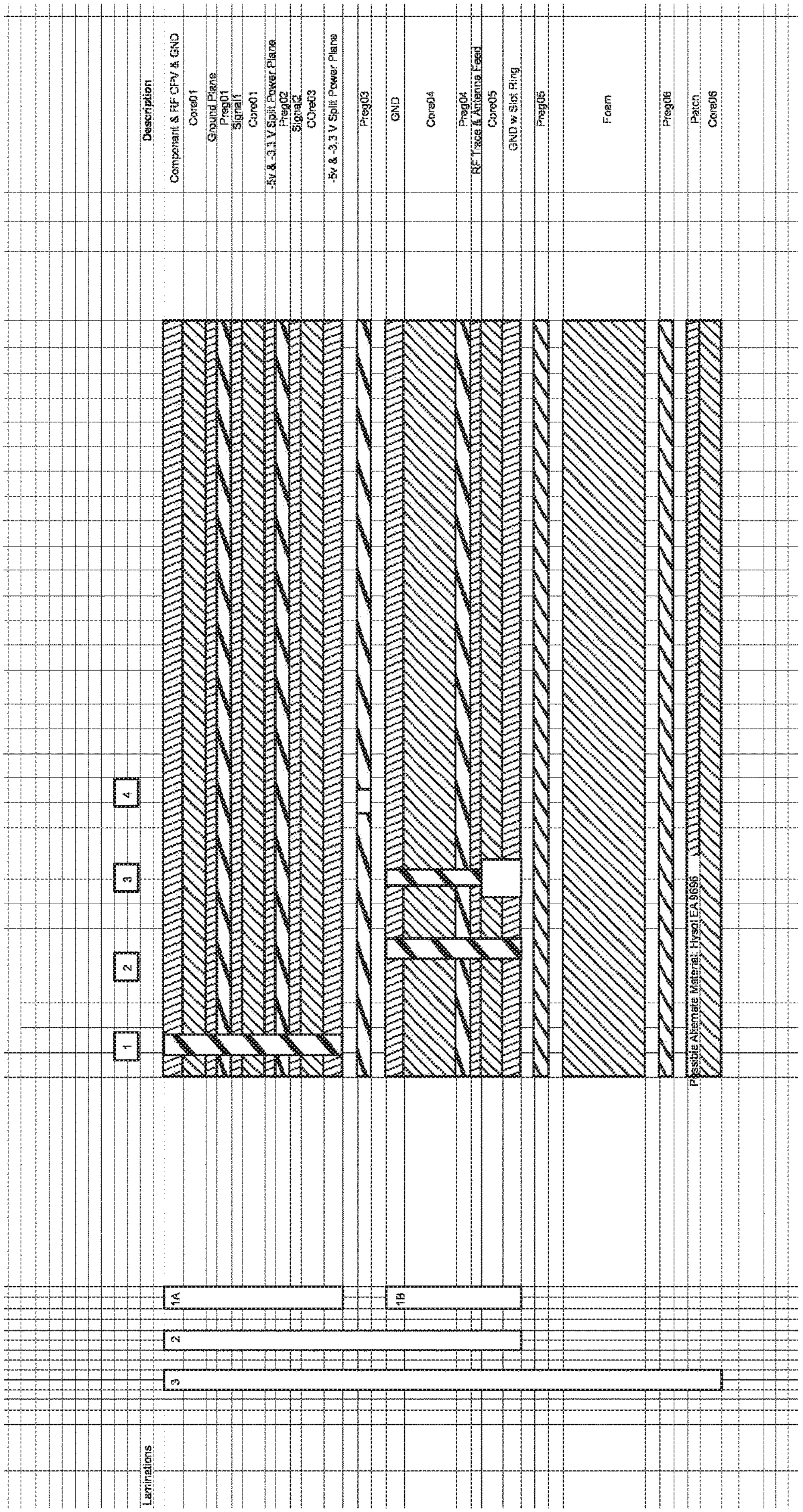
FIG. 10 illustrates another AIPWB for an antenna array that is built with several ring cells, according to some of the disclosed implementations.

FIG. 9 illustrates an AIPWB 900 for the antenna array 702 that is built with several ring cells 100, according to some of the disclosed implementations. AIPWB 900 includes nine vias (1-9) and various laminations (1, 2, 3), one of which is split into two separate sub-laminations (1A and 1B). Sub-lamination 1A includes layers 1 to 6 and provides control and power routing for MMICs using a single drill step as well as RF interconnects on layer 1. Sub-lamination 1B covers layers 7 to 9 and is an RF a-symmetric stripline, which provides RF distribution across the antenna array 702 to quad (or other multiplier)-element beamforming MMICs as well as feed structures to the aperture couple patches. The sub-lamination 1B has one drill step for the RF suppression vias used for isolation between radiating structures and the RF distributing network. Lamination 2 may be implemented with a coast-to-coast layer 1-to-layer 9 via as shown in FIG. 9, or the electrical join of sub-laminations 1A and 1B can be accomplished with an Ormet paste process as shown in FIG. 10. Lamination 3 connects the entire PCB structure with a foam spacer (e.g., foam layer 116) and electrically-isolated radiating patches on layer 10.

FIG. 10 illustrates another AIPWB 1000 for the antenna array 702 that is built with several ring cells 100, according to some of the disclosed implementations. AIPWB 1000 is an aperture-coupled patch antenna array element that requires no vertical interconnects between radiating layers while still suppressing surface modes across the array and limiting mutual coupling. AIPWB 1000 dramatically reduced PCB complexity over conventional line-of-sight (LOS) radiator designs. The new aperture coupled patch antenna array element supports a grating lobe free scan volume of +/−45 degrees in elevation over all azimuth angles without any scan blindness. Using the AIPWB 1000, the antenna array 702 may be pushed to scan beyond 45 degrees; however, steeper gain roll-off is expected when operating in these scan regions.

In some implementations, the antenna array 702 uses a mature and full-featured commercial-off-the-shelf half-duplex phased-array chipset. Such chipset, in some examples, is operational from 8-16 GHz. In some implementations, the chipset consists of two land grid array (LGA) MMICs: a quad-element SiGe beamformer and a RF frontend IC consisting of a low-noise amplifier (LNA) with a single pole double throw (SPTD) switch.

Figure 11:
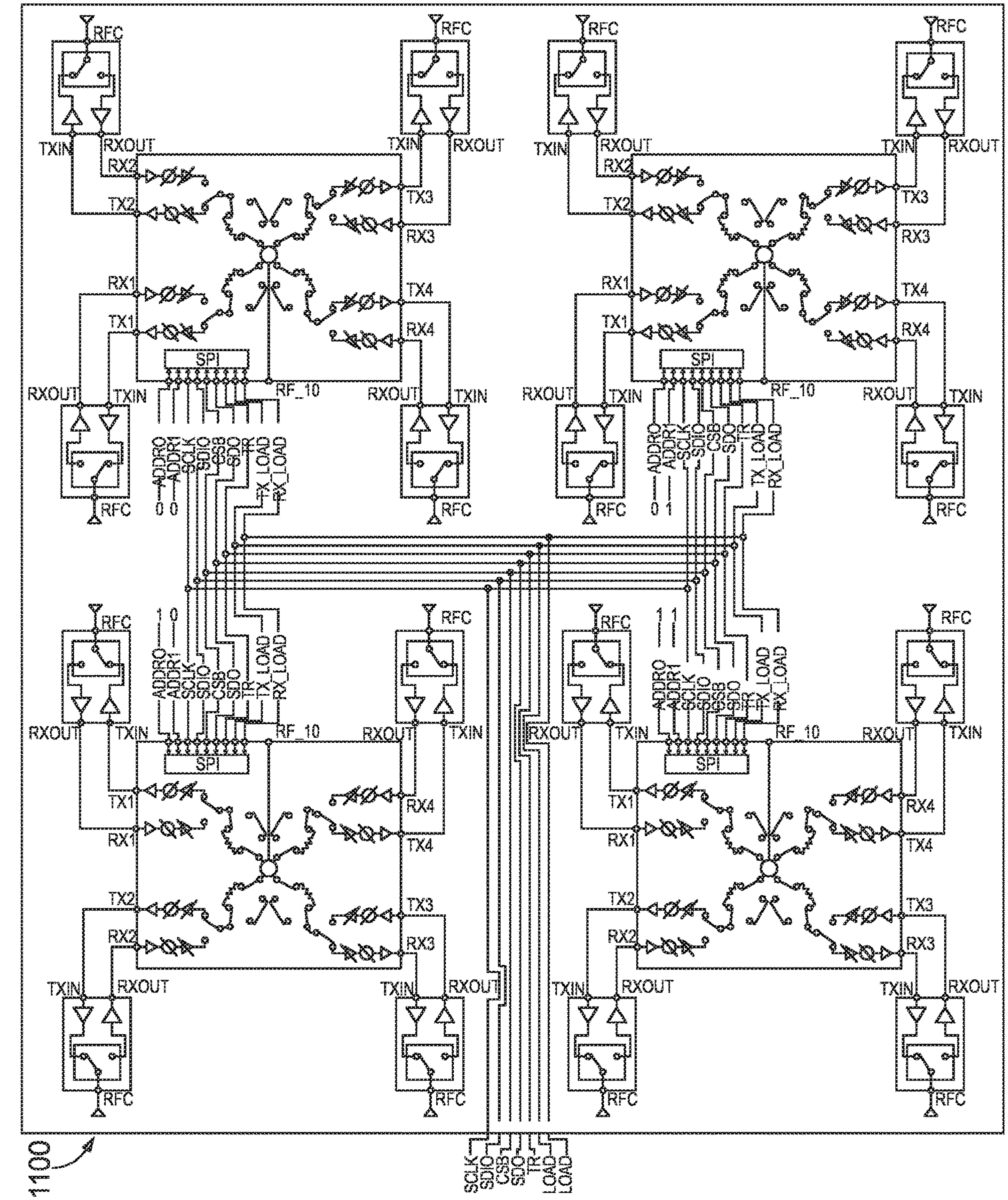
FIG. 11 illustrates a schematic diagram of a sixteen-ring cell subarray using one type of beamformer and frontend integrated circuit (IC), according to some of the disclosed implementations.
Figure 12:
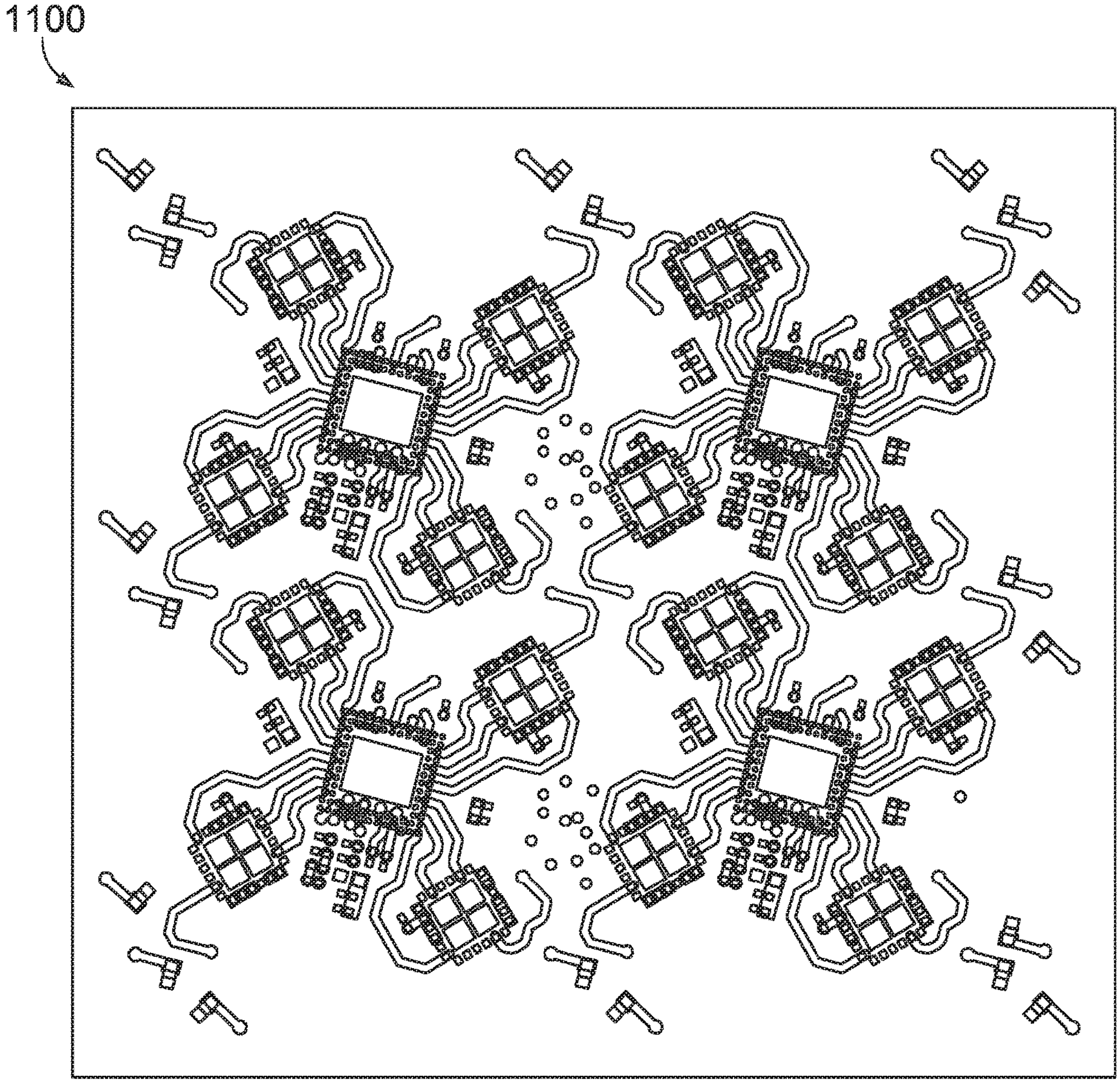
FIG. 12 illustrates a Layer 1 of an interface for MMICs for the sixteen-ring cell subarray antenna 1100.

FIG. 11 illustrates a schematic diagram of a conventional sixteen-ring cell subarray antenna 1100 using one type of beamformer and frontend integrated circuit (IC), according to some implementations. A quad element beamformer is shown, but any beamformer may be used. The sixteen-ring cell subarray antenna 1100 multiple antenna arrays 702 that have various ring cells 100/400. A single four-wire serial peripheral interface (SPI) bus controls the 16-element subarray. In some implementations, these sixteen-ring cell subarray antenna 1100*s* are tiled together in a PCB panel to produce any 16n element array where n is an integer greater than 1. The sixteen-ring cell subarray antenna 1100 is MMIC agnostic and can be easily altered to fit a different commercial-off-the-shelf MMIC chipset.

Figure 13:
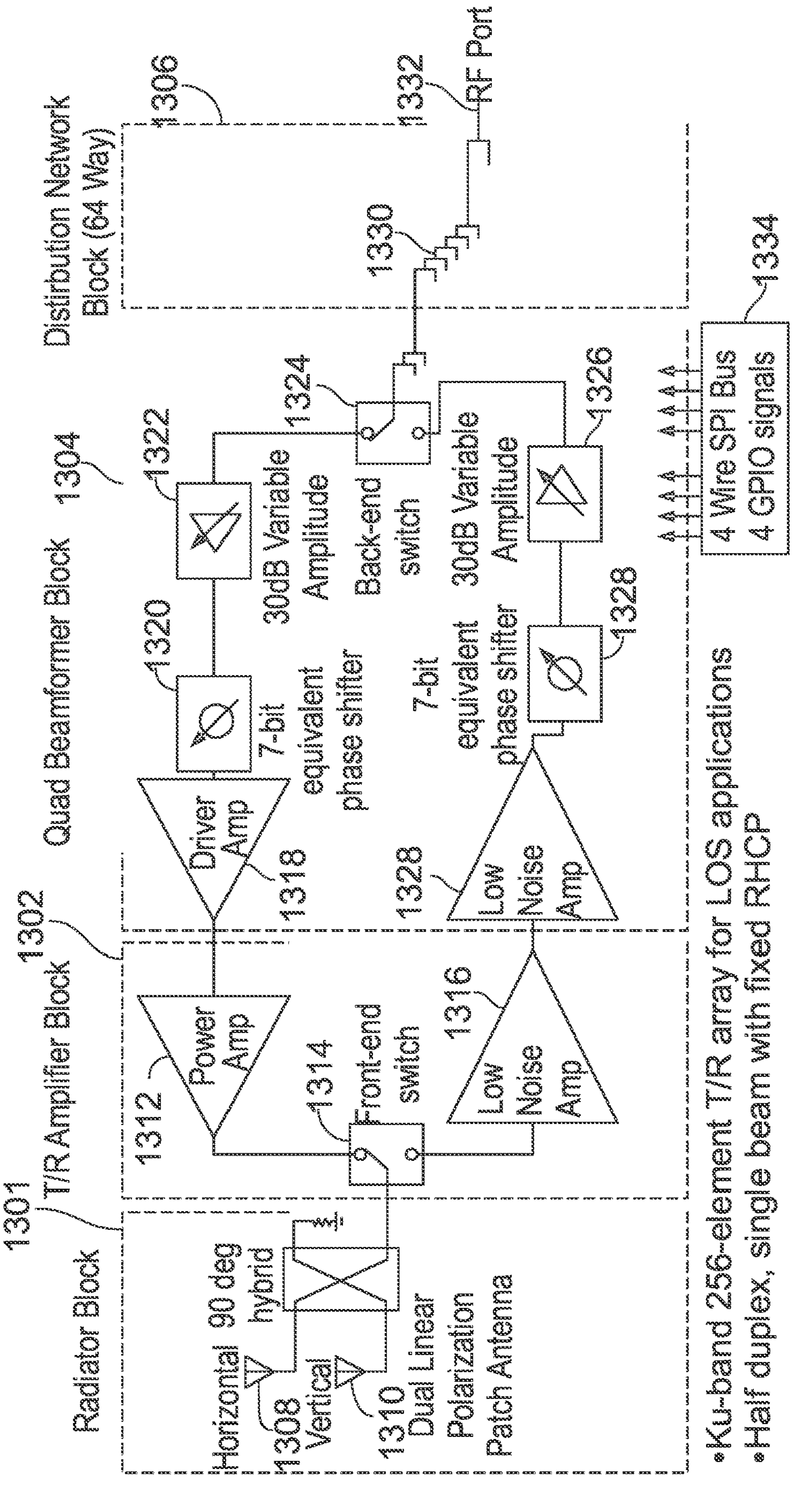
FIG. 13 illustrates a block diagram of a transmit/receive antenna array for line-of-sight applications, according to some of the disclosed implementations.

FIG. 13 illustrates a block diagram of a transmit/receive antenna array 1300 for LOS applications, according to some of the disclosed implementations. In some implementations, the antenna array 1300 functions as a 256-element transmit/receive half-duplex antenna, operating in transmit or receive mode for half the time. Specifically, the antenna array 1300 includes a radiator block 1301, a transmit/receiver (T/R) amplifier block 1302, a beamformer block 1304, and a distribution network block 1306. The radiator block 1301 includes a dual-linear polarization patch antenna with two perpendicularly placed antenna elements: horizontal element 1308 and vertical element 1310. The T/R amplifier block 1302 includes a power amplifier 1312, a front-end switch 1314, and a low-noise amplifier 1316. The beamformer block 1304 includes a driver amplifier 1318, seven-bit equivalent (or other) phase shifters 1320 and 1328, variable operational amplifiers (op amps) 1322 and 1326, a backed-end switch 1324, and a low-noise amplifier 1328. The beamformer block 1304 may take the form of a dual, quad, or other multiple element beamformer. The distribution block 1406 includes a splitter 1330 and an RF port 1332, the latter for receiving an RF input for transmission or directing a received RF input that has been received.

The front-end switch 1314 and the back-end switch 1324 are controlled to selectively configure the antenna array 1300 in transmit or receive modes. The depicted example shows the antenna array 1300 in transmit mode. Alternatively, front-end switch 1314 and the back-end switch 1324 may both be switched to their other throws for receive mode.

When operating in the transmit mode, the RF input 1332 is received and broken into 64 different ways by splitter 1330. This 64-way broken signal is passed through the back-end switch 1324 to the op amp 1322, phase shifter 1320, and power amplifier 1312 before being supplied through the front-end switch 1314 to the radiator block 1301 where the RF signal is transmitted.

When operating in the receive mode, an RF input is received at the radiator block 1301. This received RF signal is passed through the front-end switch 1314 to the low-noise amplifiers 1316 and 1328, the phase shifter 1328, and the power amplifier 1326. The amplified RF signal is then provided through the back-end switch 1320, through the splitter 1330, and out the RF port 1332.

While the foregoing disclosed embodiments provide many advantages, there remains an opportunity to improve signal isolation between the antenna element or antenna feed structure and the radio frequency (RF) distribution element or distribution layer in order to avoid feedback issues. This may be particularly true when size (e.g., number of elements) and power of the antenna array is increased. As a result, there exists a need for PAAs that provide high isolation between an antenna feed structure and an RF distribution layer. High isolation may be achieved by embedding the symmetric stripline RF distribution layer within the asymmetric stripline of the antenna feed structure. As a result, the high isolation between the antenna feed structure and the RF distribution layer allows the antenna element to be used in higher gain and high-power arrays.

Figure 14:
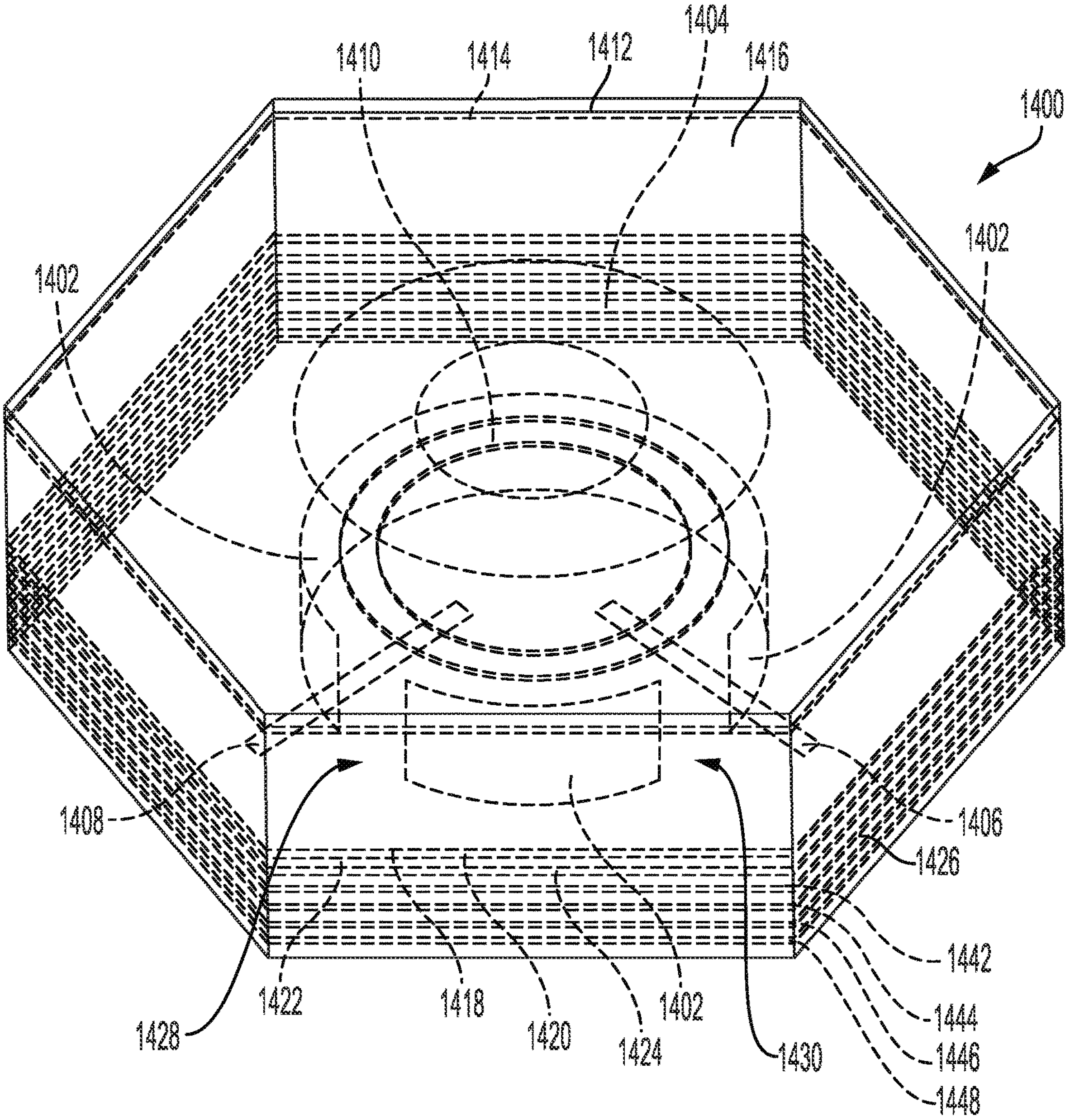
FIG. 14 illustrates a perspective view of a ring cell with an electrically conductive fence including a plurality of additional adhesive layers, according to some of the disclosed implementations.

FIG. 14 illustrates a perspective view of a ring cell 1400 with an electrically conductive fence 1402 ("ring fence" 1402), according to some of the disclosed implementations. Similar to ring cell 100, the ring cell 1400 comprises a number of circuit board-based sections. In addition to the electrically conductive fence 1402, the ring cell 1400 includes a ring patch 1404, two electrical feed lines 1406 and 1408, a ring slot 1410, a top dielectric layer 1412, a top adhesive layer 1414, a foam layer 1416, an upper internal adhesive layer 1418, an internal metal layer 1420, a middle dielectric layer 1422, and a bottom dielectric layer 1426. Unlike ring cell 100, ring cell 1400, in at least some embodiments, includes a plurality of additional layers (e.g., "lower" dielectric and adhesive layers). For example, some implementations may include a top lower adhesive 1442, a top lower dielectric layer 1444, a bottom lower adhesive layer 1446, and a bottom lower dielectric layer 1448. In some implementations, the foam layer 116 comprises a foam layer that separates the ring patch 1404 from the ring slot 1410, and is thus referred to herein as the "foam layer" 1416. The foam layer 1416 provides a spacer between the ring slot 1410 and the ring patch 1404, and a low dielectric constant close to air is selected to maximize scan impedance bandwidth and suppress unwanted dielectric modes. In some examples, the various dielectric layers 1412, 1422, 1426, 1444, and 1448 are printed circuit boards (PCBs). Moreover, the ring patch 1404 may be formed, etched, or adhered to the foam layer 1416 by the top adhesive layer 1414 to hold the ring patch 1404 in place. As can be seen in greater detail in FIG. 15, the additional plurality of dielectric layers including, for example, the top lower dielectric layer 1444, 1548 and the bottom lower dielectric layer 1448, 1548 provide high isolation between an antenna feed structure and an RF distribution layer.

The electrically conductive fence 1402 includes one or more metallic (or otherwise conductive) walls. An alternative design shown in FIG. 17 replaces the metallic walls with a circular pattern of electrical vias.

More specifically, the horizontal top section of the ring cell 1400 includes the top dielectric layer 1412 that supports the ring patch 1404 below and also serves as an environmental shield against corrosion. The ring patch 1404 includes a cutout hole that reduces the resonance frequency of the patch and allows a smaller outside diameter, which is desirable for mutual coupling reduction and avoidance of over-emphasis of broadside antenna gain.

The bottom section of the ring cell 1400 includes a plurality of layers of dielectric substrates including the middle dielectric layer 1422, the bottom dielectric layer 1426, the top lower dielectric layer 1444, and the bottom lower dielectric layer 1448 that collectively support the ring slot 1410, dual feed lines 1406 and 1408, and the thin electrically conductive fence 1402. A plurality of thin adhesive layers 1424, 1442, and 1446 are sandwiched between and bond the plurality of dielectric layers together. The feed lines 1406 and 1408 provide electrical supply that excite orthogonal resonant modes in the ring slot 1410, which, in turn excites orthogonal resonant modes in the ring patch 1404 above for RF signaling. When transmitting RF signals, the electrical feed lines supply the electrical supply (voltage and current) to generate electrical resonance in the ring 1410 that, then, generates the desired RF signal in the ring patch 1404. When receiving RF signals, the electrical feed lines receive electrical supply induced in the ring 1410 from the ring patch 1404 receiving an RF signal.

The ring slot 1410 and the ring patch 1404 work together to provide a wider impedance bandwidth than either one alone could provide. The ring cell 1400 is thus designed to operate as a hybrid radiator, working in both transmit and receive modes. Alternatively, the ring cell 1400 may operate in just transmit or in just receive mode.

The electrically conductive fence 1402 shields the ring slot 1410 from an RF power distribution network and reduces unwanted mutual coupling with other ring slots 1410 in neighboring ring cells 1400 that are part of an array antenna (e.g., a PAA). The diameter and depth of the electrically conductive fence 1402 are set so that the ring slot 1410 resonates at or near the desired operating frequency band. In some implementations, openings 1428 and 1430 around the electrically conductive fence 1402 allow the feed lines 1406 and 1408 to go inside without being electrically shorted.

The ring patch 1404 and electrically conductive fence 1402 are metallic or otherwise electrically conductive. Electricity is supplied to the ring cell 1400 through the feed lines 1406 and 1408, causing the ring fence 1402 and ring patch 1404 to operate as a radiating element for generating specific RF signals. Shape-wise, the electrically conductive fence 1402 has a larger diameter than the ring slot 1410. This allows the ring slot 1410 to be positioned, horizontally, inside the electrically conductive fence 1402. Though, as can be seen in FIG. 15, the ring slot 1410, 1510 is positioned vertically above the electrically conductive fence 1402, 1502, at least in some implementations.

Figure 18A:
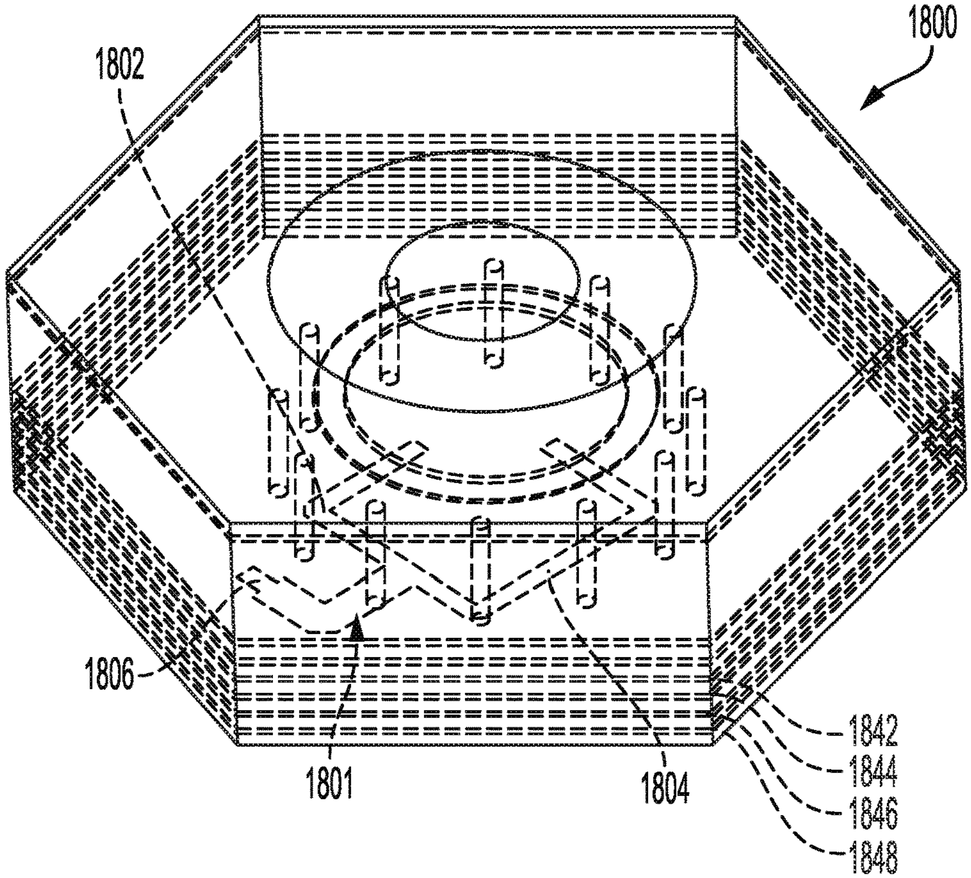
FIGS. 18A and 18B illustrate perspective and top views, respectively, of a ring cell with a T-junction delay feed line, according to some of the disclosed implementations.
Figure 18B:
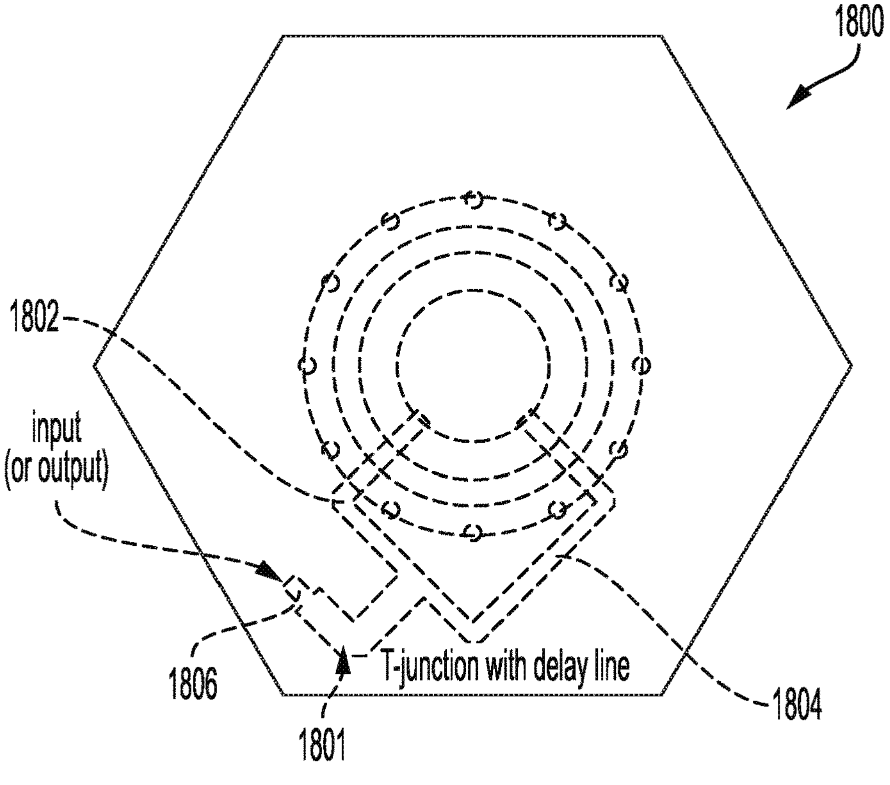
Figure 19A:
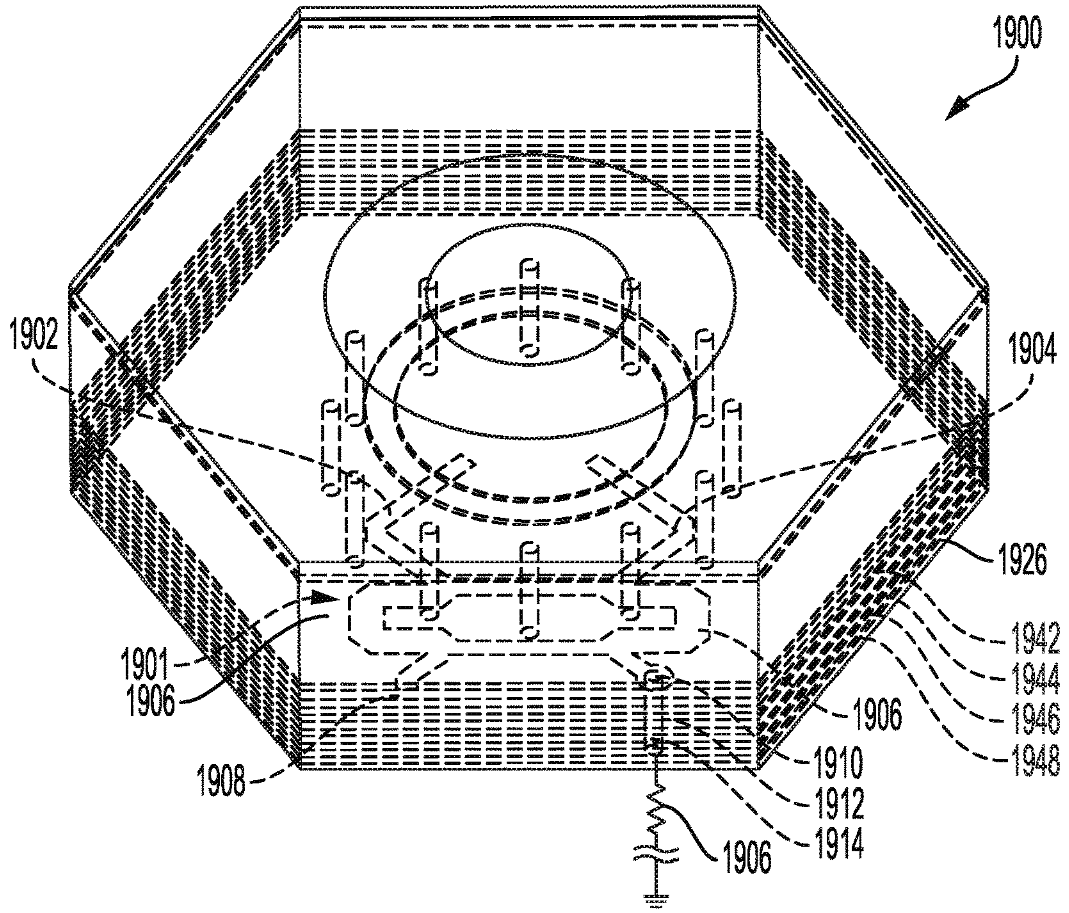
FIGS. 19A and 19B illustrate perspective and top views, respectively, of a ring cell with a 90-degree hybrid coupler, according to some of the disclosed implementations.
Figure 19B:
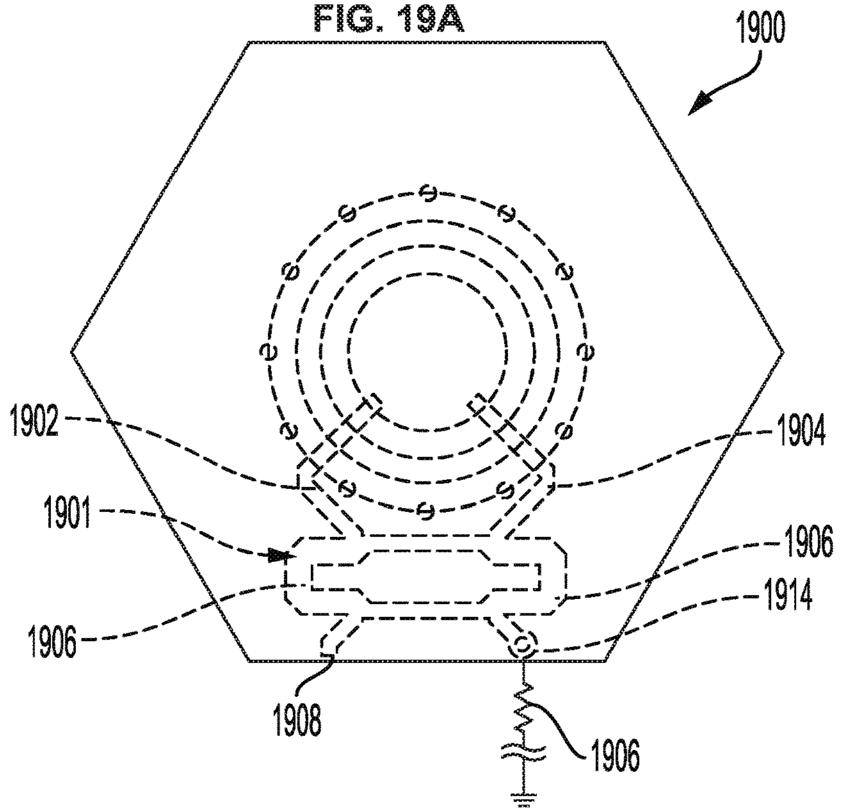

The dual electrical feed lines 1406, 1506 and 1408, 1508 excite orthogonal dual-linear polarizations necessary for some applications. For other applications, a dual or single circular polarization may be required. Alternatively, some implementations include a feed structure using a T-junction divider/combiner (transmit/receive, respectively) and a 90-degree delay line for right-hand circular polarization, which is shown in FIGS. 18A and 18B. This integrated co-planar feed provides an economical way to achieve optimal polarization performance in the far-field. Left-hand circular polarization can also be realized by moving the L-shaped input line section from the current position to the other side of the V-shaped junction. For improved circular polarization performance over scan, other implementations use a different feed structure that uses a 90-degree hybrid coupler, which is shown in FIGS. 19A and 19B.

The illustrated ring cells 1400 disclosed herein are shaped in a hexagonal pattern. Yet, other shapes are fully contemplated as well. For instance, the ring cell 1400 may be circular, rectangular, square, or the like. In these non-hexagonal shaped ring cells 1400, some implementations still use a circular ring patch 1404, ring slot 1410, and electrically conductive fence 1402.

Figure 15:
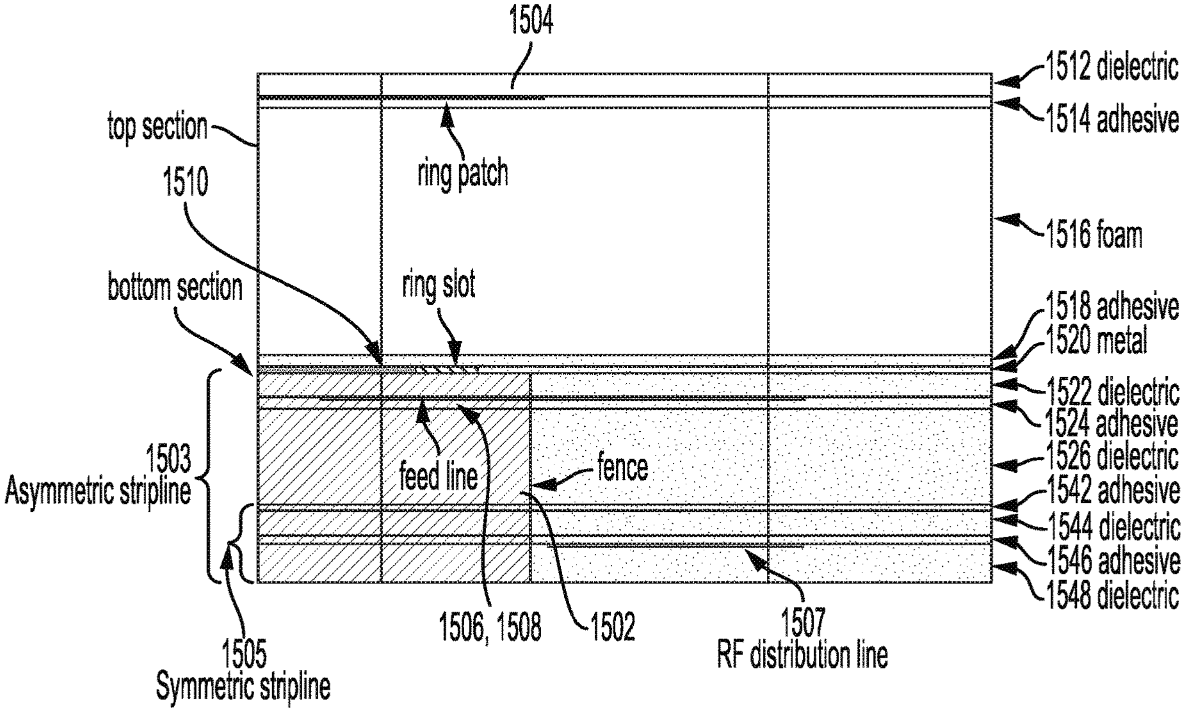
FIG. 15 illustrates a cut-out side view of a ring cell with an electrically conductive fence including a plurality of additional adhesive layers, according to some of the disclosed implementations.

FIG. 15 illustrates a cut-out side view of the ring cell 1500 (which is structurally identical to ring cell 1400) with the electrically conductive fence 1502, according to some of the disclosed implementations. As depicted, the ring cell includes a top section and a bottom section. The top section includes a top dielectric layer 1512, a ring patch 1504, a top adhesive layer 1514, a foam layer 1516, and a lower adhesive layer 1518. The bottom section includes ring slot 1510, an upper internal metal layer 1520, a middle dielectric layer 1522, an upper adhesive layer 1524, a bottom dielectric layer 1526, an upper lower adhesive layer 1542, a top lower dielectric layer 1544, and a bottom lower dielectric layer 1548. The ring patch 1504 is positioned atop the top adhesive layer 1514 and below the dielectric layer 1512. The foam layer 1516 separates the top adhesive layer 1514 from the ring slot 1510. Specifically, the foam layer 1516 is positioned between the top adhesive layer 1514 and the upper internal adhesive layer 1518. The ring slot 1510 is situated within the internal metal layer 1520. The electrically conductive fence 1502 is situated within the bottom section of the ring cell 1500 and spans across the middle dielectric layer 1522, the upper adhesive layer 1524, the bottom dielectric layer 1526, the upper lower adhesive layer 1542, the top lower dielectric layer 1544, and the bottom lower dielectric layer 1548.

The bottom section of the ring cell 1500 also includes an asymmetric stripline 1503, and a symmetric stripline 1505. The disclosed example shows the feed lines 1506 and 1508 being positioned within the symmetric stripline 1503 of the electrically conductive fence 1502, and an RF distribution line 1507 being positioned within the symmetric stripline 1505. In at least some implementations, the symmetric stripline 1503 is embedded within the asymmetric stripline. Embedding the symmetric stripline 1505 including the RF distribution line 1507 within the symmetric stripline 103 provides high isolation of the antenna feed and the distribution network. In at least some implementation, embedding the symmetric stripline 1505 including RF distribution line 1507 (i.e., RF distribution layer or RF distribution network) within the asymmetric stripline 1503 (i.e., the antenna feed structure), the isolation may be increased by up to 30 dB without adding any additional physical thickness to the PCB. The isolation is increased due to the physical separation of the antenna feed and the distribution network in the z-direction as well as the addition of a ground layer in between the structure to prevent coupling. As a result, the high isolation between the antenna feed structure and the RF distribution layer allows the antenna element to be used in higher gain and high-power arrays. For example, FIGS. 20 and 23 below show the unit cell 2000, 2300 including the symmetric stripline having an RF distribution line embedded within the asymmetric stripline.

Figure 16:
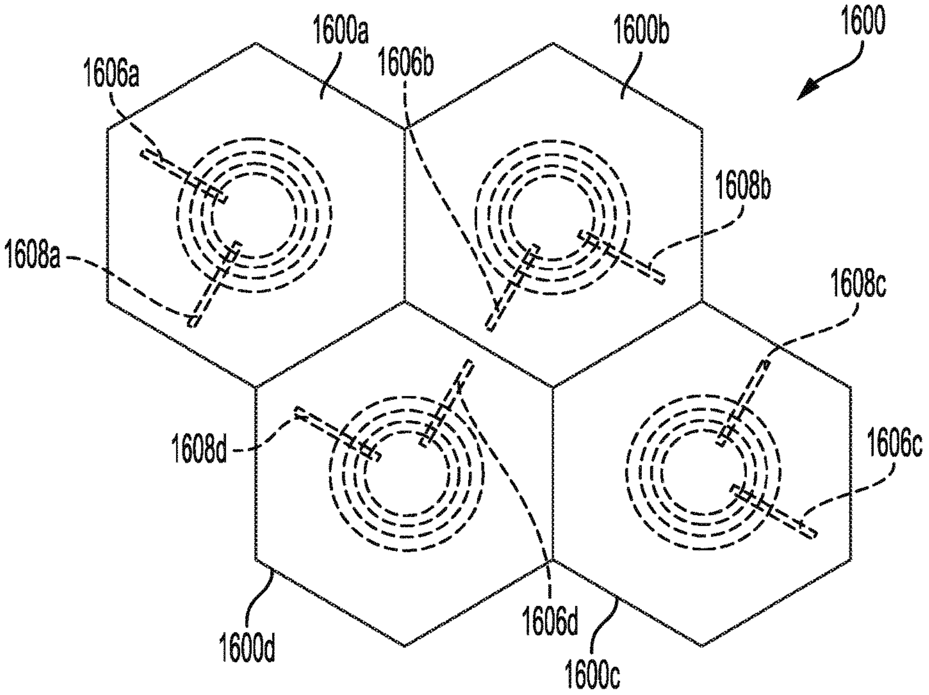
FIG. 16 illustrates a top view of an antenna array made up of multiple ring cells, according to some of the disclosed implementations.

FIG. 16 illustrates a top view of an antenna array 1600 made up of multiple ring cells 1600*a-d*, according to some of the disclosed implementations. In at least some implementations, the antenna array 1600 includes ring cells 1600*a-d* which are structurally identical to ring cells 1400 and 1500. This illustration shows one example where electrical feed lines 1606*a-d* and 1608*a-d* of the various ring cells 1600*a-d* with a 90-degree rotation. In other words, feed lines 1606*a* and 1608*a* are rotated 90 degrees from the positions of feed lines 1606*b* and 1608*b*. This positioning suppresses undesirable cross-polarization signal level in the far-field.

An alternative design that does not use the electrically conductive fence 1402, 1502 is shown in FIGS. 17-19B. Instead of an electrically conductive fence 1402, 1502, as shown in FIGS. 14-15, these alternative implementations form a circular fence using a collection of electrical vias.

Figure 17:
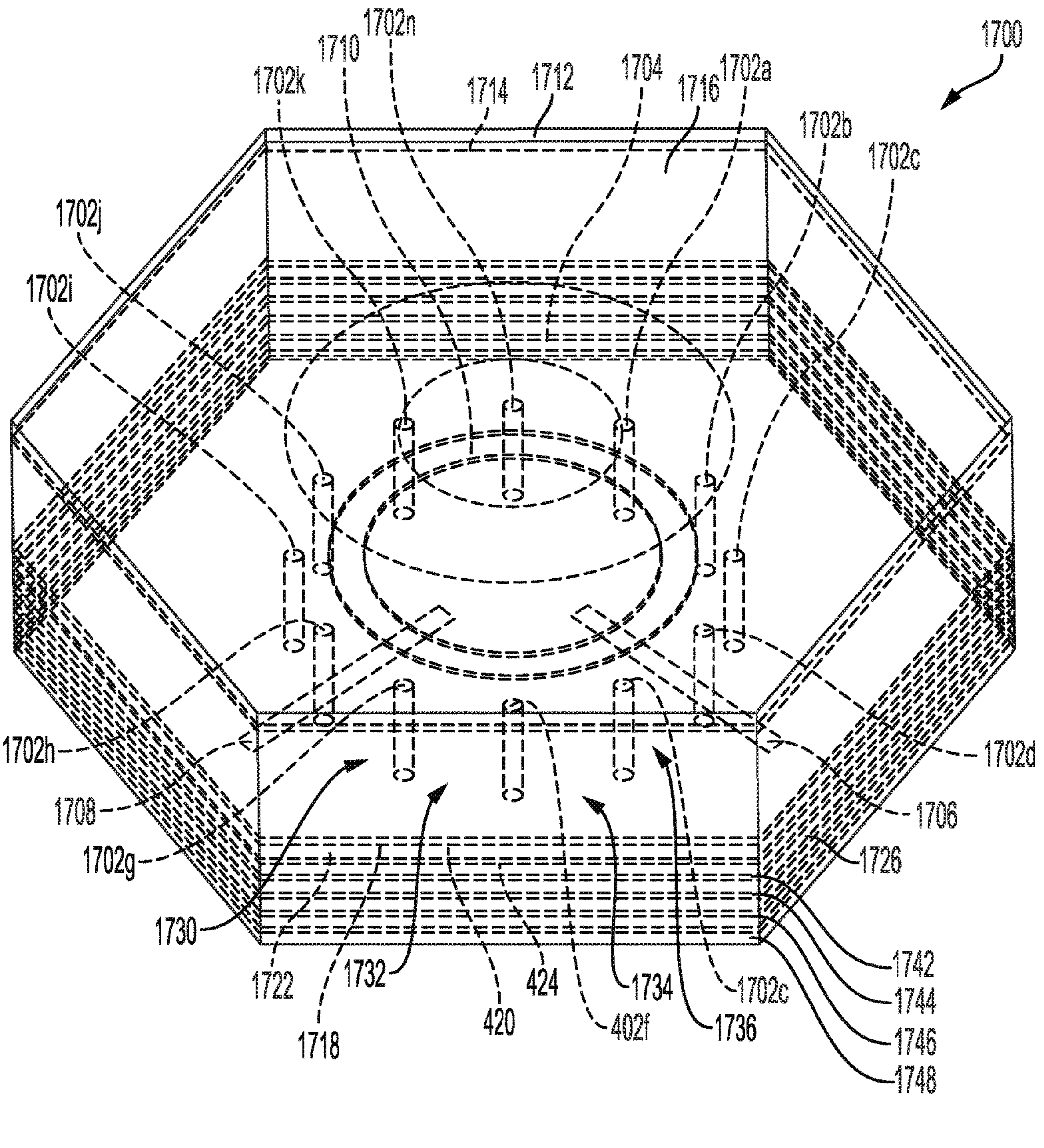
FIG. 17 illustrates a perspective view of a ring cell with a circular via fence including a plurality of additional adhesive layers, according to some of the disclosed implementations.

Along these lines, FIG. 17 illustrates a perspective view of a ring cell 1700 with a circular via fence 1702, according to some of the disclosed implementations. The ring cell 1700 a ring patch 1704, two electrical feed lines 1706 and 1708, a ring slot 1710, a top dielectric layer 1712, a top adhesive layer 1714, a foam layer 1716, an upper internal adhesive layer 1718, an internal metal layer 1720, a middle dielectric layer 1722, a bottom dielectric layer 1726, a top lower dielectric layer 1744, and the bottom lower dielectric layer 1448. As with the ring cells 1400, 1500, a plurality of thin adhesive layers (not shown here) are sandwiched between and bond the plurality of dielectric layers together. These various components are positioned in the same manner previously discussed with respect to ring cell 1400, 1500. Yet, instead of the electrically conductive fence 1402, the ring cell 1700 includes electrical vias 1702*a-n* that are positioned in a circular pattern around the ring slot 1710, collectively forming a via fence with numerous openings 1730-1736 (though, only four openings are labeled).

Like the ring cell 1400, 1500, the horizontal top section of the ring cell 1700 includes the top dielectric layer 1712 that supports the ring patch 1704 below and also serves as an environmental shield against corrosion. The ring patch 1704 includes a cutout hole that reduces the resonance frequency of the patch and allows a smaller outside diameter, which is desirable for mutual coupling reduction and avoidance of over-emphasis of broadside antenna gain.

The bottom section of the ring cell 1700 includes a plurality of layers of dielectric substrates including the middle dielectric layer 1722, the bottom dielectric layer 1726, the top lower dielectric layer 1744, and the bottom lower dielectric layer 1748 that collectively support the ring slot 1710, dual feed lines 1406 and 1408, and the via fence formed by the electrically conductive vias 1702*a-n*. A plurality of thin adhesive layers (not shown here) are sandwiched between and bond the plurality of dielectric layers together. The feed lines 1706 and 1708 provide electrical supply that excite orthogonal resonant modes in the ring slot 1710, which, in turn excites orthogonal resonant modes in the ring patch 1704 above for RF signaling. When transmitting RF signals, the electrical feed lines supply the electrical supply (voltage and current) to generate electrical resonance in the ring 1710 that, then, generates the desired RF signal in the ring patch 1704. When receiving RF signals, the electrical feed lines receive electrical supply induced in the ring 1710 from the ring patch 1704 receiving an RF signal.

The ring patch 1704 and electrically electrical vias 1702*a-n* are metallic or otherwise electrically conductive. Electricity is supplied to the ring cell 1700 through the feed lines 1706 and 1708, causing the electrical vias 1702*a-n* and ring patch 1704 to operate as a radiating element for generating specific RF signals. Shape-wise, the via fence has a larger diameter than the ring slot 1710. This allows the ring slot 1710 to be positioned, horizontally, inside the electrically conductive fence 1702.

The via fence created by the electrical vias 1702*a-n* also shield the ring slot 1710 from a power distribution network and reduce unwanted mutual coupling with other ring slots 1710 in neighboring ring cells 1700 that are part of an array antenna (e.g., a PAA). The diameter and depth of the via fence are set so that the ring slot 1710 resonates at or near the desired operating frequency band. In some implementations, the openings around the electrically conductive fence 1702 allow the feed lines 1706 and 1708 to go inside without being electrically shorted. The feed lines 1706 and 1708 are positioned vertically in the upper half of the electrical vias 1702*a-n*. Other than the features related to the electrically conductive fence 1702 outlined above, the ring cell 1700 is substantially the same as ring cell 1400, 1500 both structurally and operationally.

FIGS. 18A and 18B illustrate perspective and top views, respectively, of the ring cell 1400, 1500 with a T-junction delay feed line 1801, according to some of the disclosed implementations. The T-junction delay feed line 1801 includes two feed lines (shorter feed line 1802 and longer L-shaped feed line 1804) that extend out from a single input/output (I/O) line 1806. Feed line 1804 is longer than feed line 1802 for circular polarization formation in the RF signals emitted or received through the ring cell 1800. These separate feed lines 1804 and 1806 are positioned 90-degrees from each other. While ring cell 1800 having electrical vias (as electrical via 1702*a-n*) is shown, the T-junction delay feed line 1801 feed line may be used in the ring cell 1400, 1500 with the electrically conductive fence 1402, 1502.

The depicted T-junction delay feed line 1801 provides right-hand circular polarization, supplying optimal polarization in the far-field. Left-hand circular polarization may also be realized by moving the longer L-shaped feed line 1804 from the illustrated position to the other side of the V-shaped junction.

The depicted T-junction delay feed line 1801 may also be used in the ring cell 1400, 1500, instead of the depicted ring cell 1700. Ring cell 1800 is only shown in FIGS. 18A-18B as one example of a ring cell with the T-junction delay feed line 1801.

FIGS. 19A and 19B illustrate perspective and top views, respectively, of the ring cell 1900 with a 90-degree hybrid coupler 1901, according to some of the disclosed implementations. The hybrid coupler 1901 includes two feed lines 1902 and 1904 and an ellipsoidal (or circular) path line 1906. In some implementations, feed lines 1906 are positioned 90-degrees from each other. The hybrid coupler 1901 includes two terminal ends 1908 and 1910. End 1908 acts as an input or output of voltage supply, depending on whether the ring cell is transmitting or receiving RF signals. End 1910 is connected to an electrical via 1912 that spans through the bottom dielectric layer 1926 and is electrically coupled to a resistor 1914. In operation, this hybrid coupler 1901 provides improved circular polarization performance.

The depicted hybrid coupler 1900 may also be used in the ring cell 1800, instead of the depicted ring cell 1900. Ring cell 1900 is only shown in FIGS. 19A-19B as one example of a ring cell with the hybrid coupler 1901.

Figure 20:
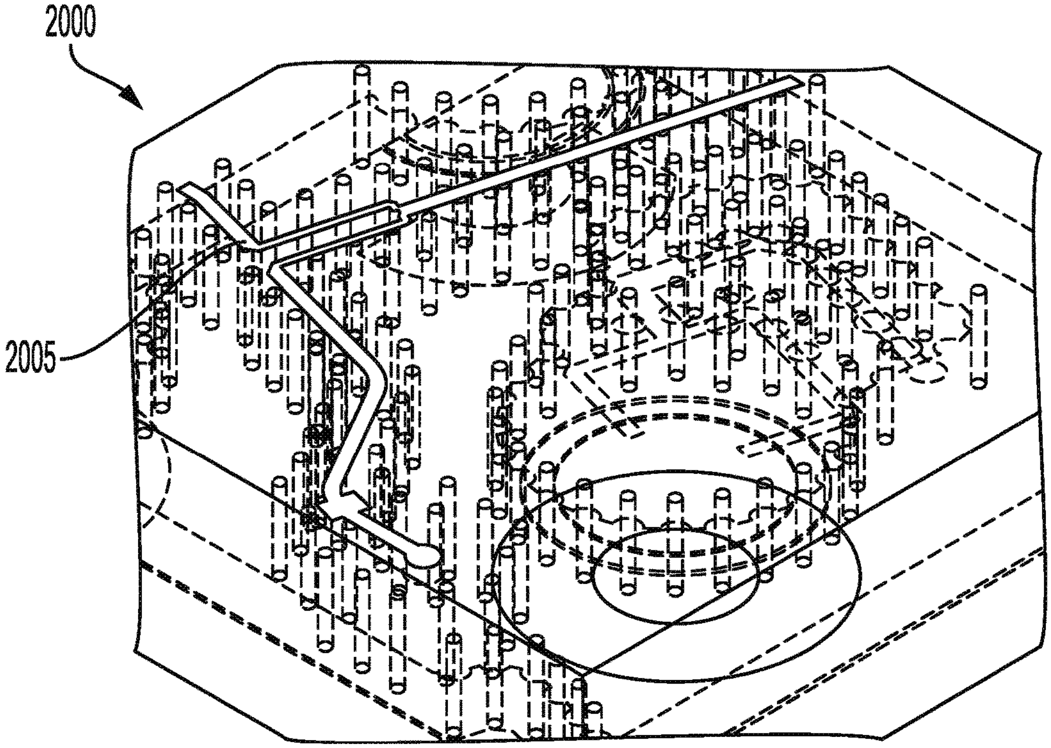
FIG. 20 illustrates an example of an antenna array made up of multiple ring cells, according to some of the disclosed implementations.

FIG. 20 illustrates an example of an antenna array according to some of the disclosed implementations. The antenna array 2000 depicts an example of a symmetric stripline 2005, as discussed with respect to FIG. 15 above. In at least some implementation, the symmetric stripline 2005 includes an embedded asymmetric stripline having an RF distribution line within the symmetric stripline.

In at least some implementations, the disclosed ring cells may be configured in an array to operate with an aircraft 800 in a similar manner as ring cell 100 as disclosed above with respect to FIG. 8.

Figure 21:
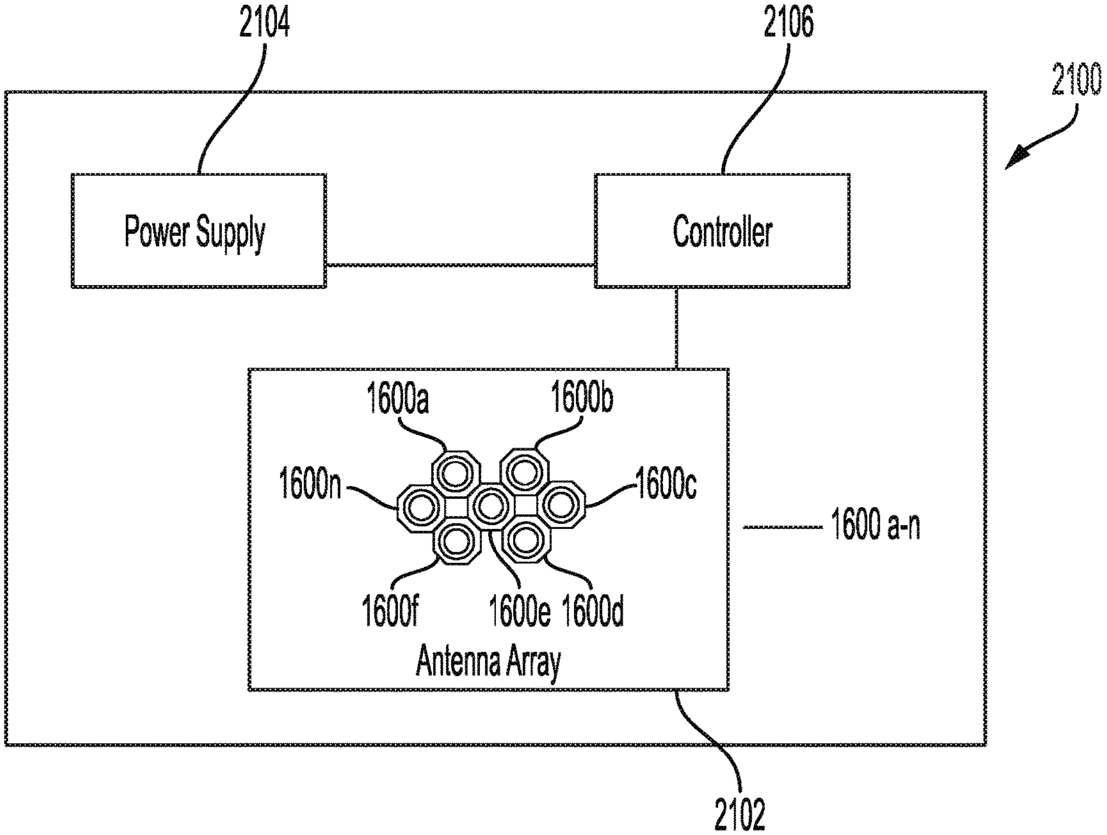
FIG. 21 illustrates a block diagram of an example of an antenna system made up of the disclosed ring cells in this disclosure.

In FIG. 21 illustrates a block diagram of an example of an antenna system 2100 for an antenna array 2102 made up of the disclosed ring cells 1600*a-n* in this disclosure. In this example, the antenna system 2100 includes a power supply 1704, a controller 1706, and the antenna array 2102. In this example, the antenna array 2102 is a phased array antenna ("PAA") that includes a plurality of the ring cells 1600*a-n* that operate either transmit and/or receive modules. Ring cells 1600*a-n* include corresponding radiation elements that in combination are capable of transmitting and/or receiving RF signals. For example, the ring cells 100*a-n* may be configured to operate within a K-band frequency range (e.g., about 20 GHz to 40 GHz for NATO K-band and 18 GHz to 26.5 GHz for IEEE K-band).

The power supply 2104 is a device, component, and/or module that provides power to the controller 2106 in the antenna system 2100. The controller 2106 is a device, component, and/or module that controls the operation of the antenna array 2102. The controller 2106 may be a processor, microprocessor, microcontroller, digital signal processor ("DSP"), or other type of device that may either be programmed in hardware and/or software. The controller 2106 controls the electrical feed supplies provided to the antenna array 2102, including, without limitation calibrating particular polarization, voltage, frequency, and the like of the electrical feeds. Only one line is shown between the controller 2106 and the antenna array 2102 for the sake of clarity, but in reality, several electrical connections and supply lines may connect the controller 2106 to the antenna array 2102.

In some implementations, the controller 2106 supplies the particular electrical feeds to the various ring cells 1600*a-n* in order to create numerous RF signals that combine, either constructively or destructively, to form a desired cumulative RF signal for transmission.

RF signals emitted from each ring cell 1600*a-n* in the array antenna 2102 may be in phase so as to constructively produce intense radiation or out of phase to destructively create a particular RF signal. Direction may be controlled by setting the phase shift between the signals sent to different ring cells 1600*a-n*. The phase shift may be controlled by the controller 2106 placing a slight time delay between signals sent to successive ring cells 1600*a-n* in the array.

The antenna system 2100 is described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

This antenna system 2100 provides a means to send (or receive) RF signals to (or from) airborne/mobile vehicles with an agile electronically scanning antenna array beam without mechanical moving parts. The antenna system 2100 can be used in communications systems and other applications, including, without limitation, for radar/sensor, electronic warfare, military applications, mobile communications, and the like. The antenna system 2100 provides a high-performance, light-weight, low-profile and affordable solution to meet challenging and evolving mission requirements.

Figure 22:
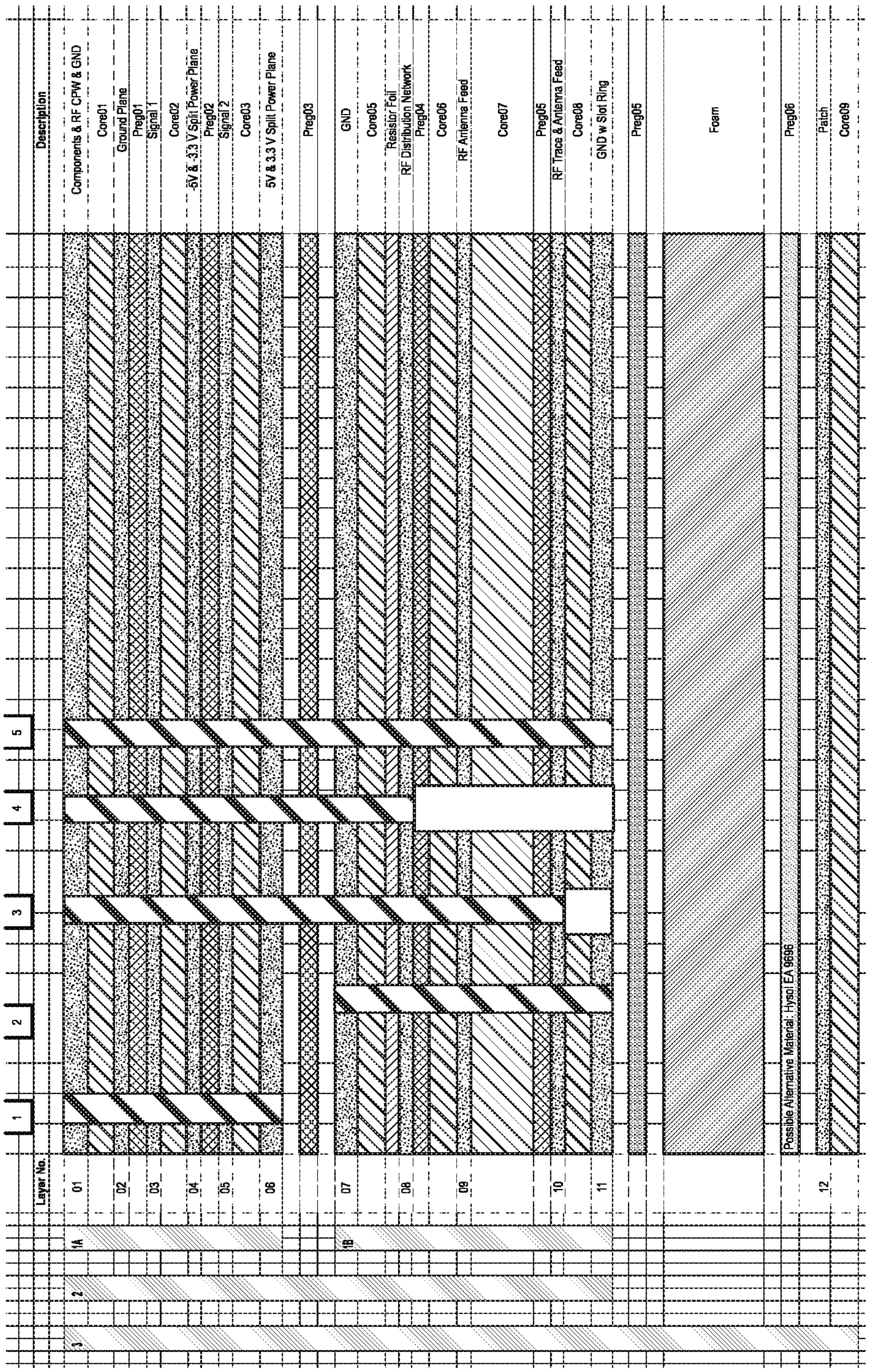
FIG. 22 illustrates an antenna integrated printed wiring board (AIPWB) for an antenna array that is built with several ring cells, according to some of the disclosed implementations.

FIG. 22 illustrates an AIPWB 2200 for the antenna array 2102 that is built with several ring cells 1600*a-n*, according to some of the disclosed implementations. AIPWB 2200 includes nine vias (1-9) and various laminations (1, 2, 3), one of which is split into two separate sub-laminations (1A and 1B). Sub-lamination 1A includes layers 1 to 6 and provides control and power routing for MMICs using a single drill step as well as RF interconnects on layer 1. Sub-lamination 1B covers layers 7 to 11 and is an RF a-symmetric stripline, which provides RF distribution across the antenna array 2102 to quad (or other multiplier)-element beamforming MMICs as well as feed structures to the aperture couple patches. The sub-lamination 1B has one drill step for the RF suppression vias used for isolation between radiating structures and the RF distributing network. Lamination 2 may be implemented with a coast-to-coast layer 1-to-layer 11 via as shown in FIG. 22, or the electrical join of sub-laminations 1A and 1B can be accomplished with an Ormet paste process as shown in FIG. 10. Lamination 3 connects the entire PCB structure with a foam spacer (e.g., foam layer 1416, 1516) and electrically-isolated radiating patches on layer 12.

Figure 23:
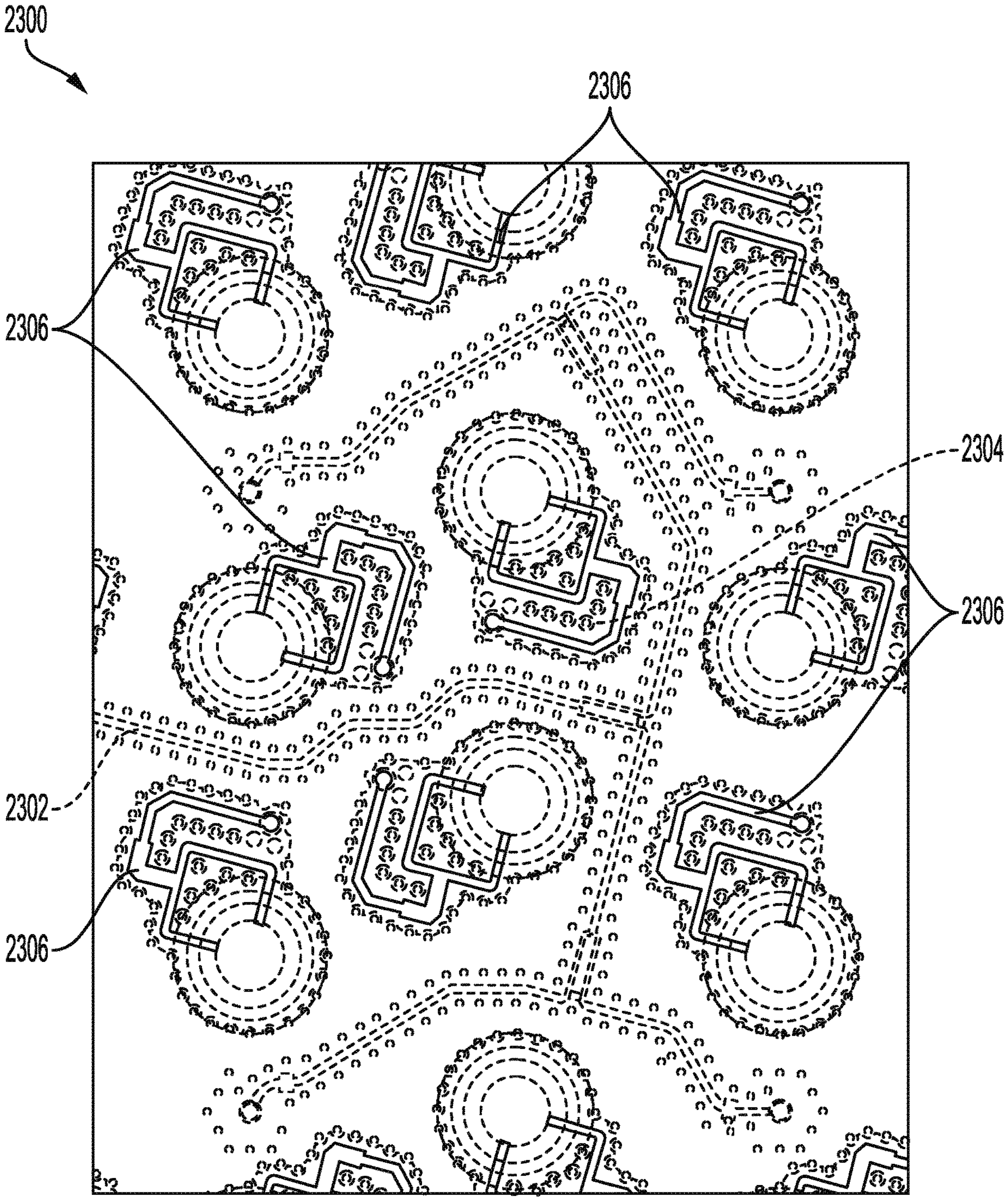
FIG. 23 illustrates a partial view of an example of an antenna array made up of the disclosed ring cells.

FIG. 23 illustrates a partial view of an antenna array 2300 made up of the disclosed ring cells 1600*a-n* in this disclosure. Depicted are elements from layers 8 to 10 including a layer 8 distribution network 2302, a layer 9 GND 2304 removed around antenna feed to maintain asymmetric stripline with the GND on layer 7 and layer 11, and layer 10 antenna feeds 2306.

In at least some implementations, the disclosed ring cells may be configured in a convention sixteen-ring array subarray antenna using a beamformer and frontend integrated circuit (IC), according to some implementations, as disclosed above with respect to FIG. 11.

Figure 24:
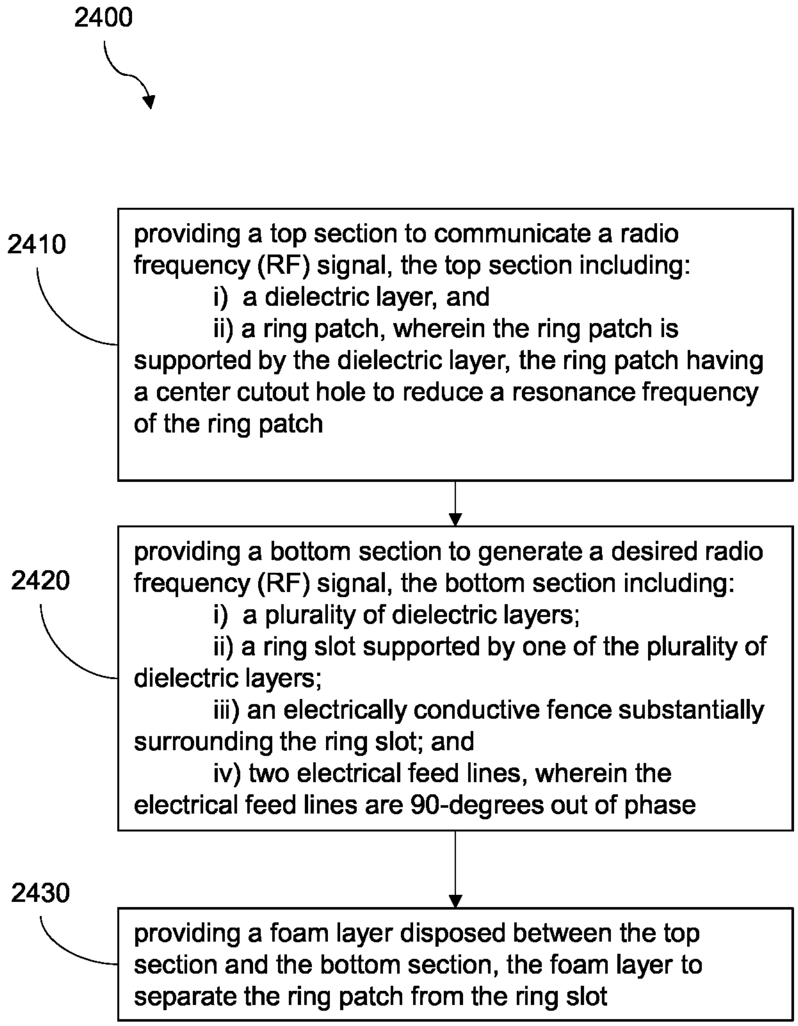
FIG. 24 shows a method for providing a unit cell antenna for a periodic antenna array, according to some of the disclosed implementations.

FIG. 24 illustrates a method for providing a unit cell antenna for a periodic antenna array, according to at least some of the disclosed implementations. In at least some examples, the method 2400 may be used to provide a unit cell (e.g., ring cell 1400, 1500), as discussed above with respect to FIGS. 14-23. The method 2400, at 2410, includes providing a top section (e.g., top section in FIG. 15) to communicate a radio frequency (RF) signal. In at least some examples, the top section is to include a dielectric layer (e.g., dielectric layer 1412, 1512), and a ring patch (e.g., ring patch 1404, 1504). The ring patch is to be supported by the dielectric layer, and the ring patch is to have a center cutout hole to reduce a resonance frequency of the ring patch. The method 2400, at 2420, includes providing a bottom section (e.g., bottom section in FIG. 15) to generate a desired radio frequency (RF) signal. In at least some examples, the bottom section is to include a plurality of dielectric layers (e.g., dielectric layers 1422, 1426, 1448; 1522, 1526, 1548), a ring slot (e.g., ring slot 1410, 1510), an electrically conductive fence (e.g., ring fence or electrically conductive fence 1402, 1502), and two electrical feed lines (e.g., electrical feed lines 1406, 1408; 1506, 1508). In at least some examples, the ring slot is to be supported by one of the plurality of dielectric layers. The electrically conductive fence is to substantially surround the ring slot. The two electrical feed lines are to be 90-degrees out of phase. The method 2400, at 2430, includes providing a foam layer (e.g., foam layer 1416, 1516) to be disposed between the top section and the bottom section. In at least some examples, the foam layer is to separate the ring patch from the ring slot. The method 2400 and configuration outlined herein provides high isolation between the top section and the bottom section and allows antenna elements to be used in higher gain and high-power arrays without adverse feedback issues.

Figure 25:
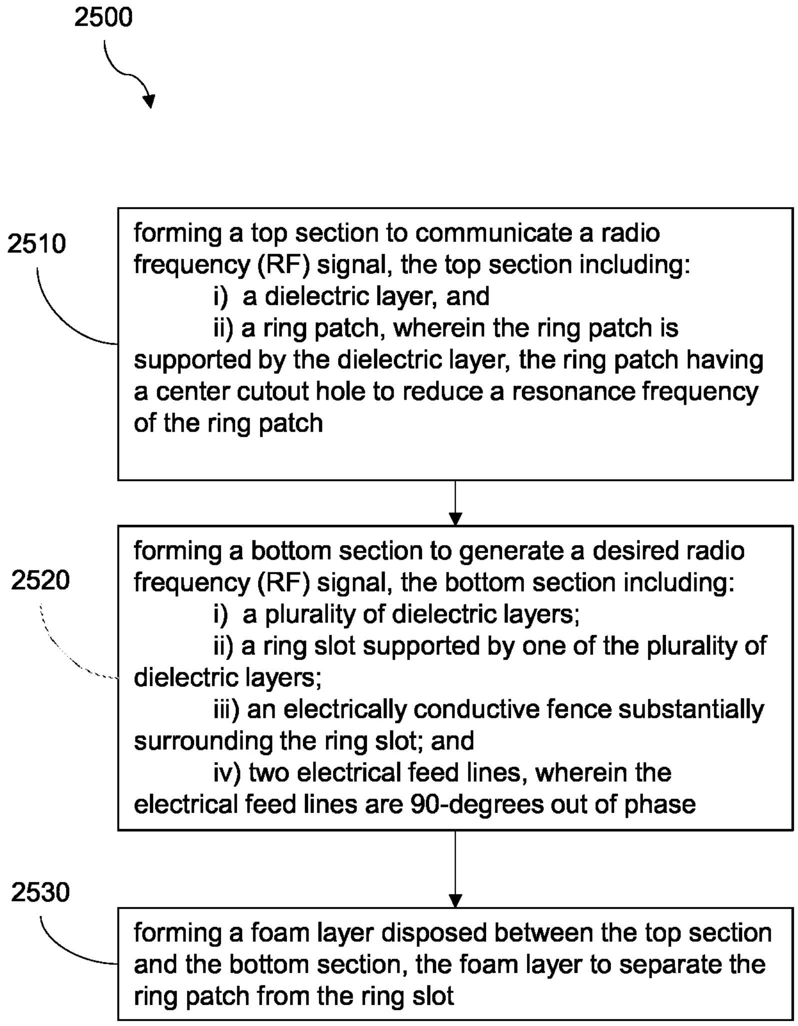
FIG. 25 shows a method of fabricating a unit cell antenna system for a periodic antenna array, according to some of the disclosed implementations.

FIG. 25 illustrates a method of fabricating a unit cell antenna system for a periodic antenna array, according to at least some of the disclosed implementations. In at least some examples, the method for fabrication 2500 may be used to fabricate, manufacture, and/or assemble a unit cell antenna system (e.g., ring cell 1400, 1500) for a periodic antenna array (e.g., antenna array 1600), as discussed above with respect to FIGS. 14-23. As disclosed herein, the steps, acts, operations, procedures, and/or processes of fabricating and/or assembling the unit cell antenna systems are to be substantially consistent with steps, acts, operations, procedures, and/or processes known by a person of ordinary skill in the fabrication, manufacturing, and/or assembly arts and industries. The method of fabrication 2500, at 2510, includes forming a top section (e.g., top section in FIG. 15) to communicate a radio frequency (RF) signal. In at least some examples, the top section is to be formed to include a dielectric layer (e.g., dielectric layer 1412, 1512), and a ring patch (e.g., ring patch 1404, 1504). The ring patch is to be formed to be supported by the dielectric layer, and the ring patch is to be formed to have a center cutout hole to reduce a resonance frequency of the ring patch. The method of fabrication 2500, at 2520, includes forming a bottom section (e.g., bottom section in FIG. 15) to generate a desired radio frequency (RF) signal. In at least some examples, the bottom section is to be formed to include a plurality of dielectric layers (e.g., dielectric layers 1422, 1426, 1448; 1522, 1526, 1548), a ring slot (e.g., ring slot 1410, 1510), an electrically conductive fence (e.g., ring fence or electrically conductive fence 1402, 1502), and two electrical feed lines (e.g., electrical feed lines 1406, 1408; 1506, 1508). In at least some examples, the ring slot is to be formed to support by one of the plurality of dielectric layers. The electrically conductive fence is to be formed to substantially surround the ring slot. The two electrical feed lines are to be formed to be 90-degrees out of phase. The method of fabrication 2500, at 2530, includes forming a foam layer (e.g., foam layer 1416, 1516) to be disposed between the top section and the bottom section. In at least some examples, the foam layer is to be formed to separate the ring patch from the ring slot. The method 2500 and configuration outlined herein provides high isolation between the top section and the bottom section and allows antenna elements to be used in higher gain and high-power arrays without adverse feedback issues.

ADDITIONAL NOTES AND EXAMPLES

Example 1 includes a unit cell antenna system for a periodic antenna array, the system comprising a top section to communicate a radio frequency (RF) signal, the top section including a dielectric layer, and a ring patch, wherein the ring patch is supported by the dielectric layer, the ring patch having a center cutout hole to reduce a resonance frequency of the ring patch; a bottom section to generate a desired radio frequency (RF) signal, the bottom section including a plurality of dielectric layers; a ring slot supported by one of the plurality of dielectric layers; an electrically conductive fence substantially surrounding the ring slot; two electrical feed lines, wherein the electrical feed lines are 90-degrees out of phase; and a foam layer disposed between the top section and the bottom section, the foam layer to separate the ring patch from the ring slot.

Example 2 includes the system of Example 1, wherein the bottom section further includes an embedded symmetric stripline RF distribution layer within an asymmetric stripline of the bottom section, wherein the embedded symmetric stripline RF distribution layer is to provide high signal isolation due to a physical separation of the top section and bottom section.

Example 3 includes the system of Example 1, wherein, when in a transmit mode, the electrical feed lines are to couple energy into the ring slot, wherein the ring slot generates a desired RF signal in the ring patch.

Example 4 includes the system of Example 1, wherein, when in a receipt mode, the ring patch is to generate electrical resonance in the ring slot, wherein the ring slot couples energy to the electrical feed lines.

Example 5 includes the system of Example 1, wherein the electrically conductive fence is to shield the ring slot from an RF power distribution network and reduce unwanted mutual coupling with other ring slots in neighboring ring cells that are part of an array antenna.

Example 6 includes the system of Example 5, wherein the electrically conductive fence is to comprise one or more metallic walls.

Example 7 includes the system of Example 5, wherein the electrically conductive fence is to comprise a circular pattern of electrical vias.

Example 8 includes the system of Example 1, wherein the electrical feed lines comprise a T-junction delay for supplying electrical feed.

Example 9 includes the system of Example 1, wherein the electrical feed lines comprise a hybrid coupler for supplying electrical feed.

Example 10 includes a method for providing a unit cell antenna for a periodic antenna array, the method comprising providing a top section to communicate a radio frequency (RF) signal, the top section including a dielectric layer, and a ring patch, wherein the ring patch is supported by the dielectric layer, the ring patch having a center cutout hole to reduce a resonance frequency of the ring patch; providing a bottom section to generate a desired radio frequency (RF) signal, the bottom section including a plurality of dielectric layers; a ring slot supported by one of the plurality of dielectric layers; an electrically conductive fence substantially surrounding the ring slot; two electrical feed lines, wherein the electrical feed lines are 90-degrees out of phase; and providing a foam layer disposed between the top section and the bottom section, the foam layer to separate the ring patch from the ring slot.

Example 11 includes the method of Example 10, wherein the bottom section further includes an embedded symmetric stripline RF distribution layer within an asymmetric stripline of the bottom section, wherein the embedded symmetric stripline RF distribution layer is to provide high signal isolation due to a physical separation of the top section and bottom section.

Example 12 includes the method of Example 10, wherein, when in a transmit mode, the electrical feed lines are to couple energy into the ring slot, wherein the ring slot generates a desired RF signal in the ring patch.

Example 13 includes the method of Example 10, wherein, when in a receipt mode, the ring patch is to generate electrical resonance in the ring slot, wherein the ring slot couples energy to the electrical feed lines.

Example 14 includes the method of Example 10, wherein the electrically conductive fence is to shield the ring slot from an RF power distribution network and reduce unwanted mutual coupling with other ring slots in neighboring ring cells that are part of an array antenna.

Example 15 includes the method of Example 14, wherein the electrically conductive fence is to comprise one or more metallic walls.

Example 16 includes the method of Example 14, wherein the electrically conductive fence is to comprise a circular pattern of electrical vias.

Example 17 includes the method of Example 10, wherein the ring patch is positioned below a dielectric layer and above the foam layer.

Example 18 includes the method of Example 10, wherein the electrical feed lines comprise a T-junction delay for supplying electrical feed.

Example 19 includes a method of fabricating a unit cell antenna system for a periodic antenna array, the method comprising forming a top section to communicate a radio frequency (RF) signal, the top section including a dielectric layer, and a ring patch, wherein the ring patch is supported by the dielectric layer, the ring patch having a center cutout hole to reduce a resonance frequency of the ring patch; forming a bottom section to generate a desired radio frequency (RF) signal, the bottom section including a plurality of dielectric layers; a ring slot supported by one of the plurality of dielectric layers; an electrically conductive fence substantially surrounding the ring slot; two electrical feed lines, wherein the electrical feed lines are 90-degrees out of phase; and forming a foam layer disposed between the top section and the bottom section, the foam layer to separate the ring patch from the ring slot.

Example 20 includes the method of Example 19, wherein the bottom section further includes an embedded symmetric stripline RF distribution layer within an asymmetric stripline of the bottom section, wherein the embedded symmetric stripline RF distribution layer is to provide high signal isolation due to a physical separation of the top section and bottom section.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an'item refers to one or more of those items.

The term "comprising" is used in this disclosure to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as an ASIC, SoC, or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. A unit cell antenna system for a periodic antenna array, the system comprising:
- a top section to communicate a radio frequency (RF) signal, the top section including:
  - a dielectric layer, and
  - a ring patch, wherein the ring patch is supported by the dielectric layer, the ring patch having a center cutout hole to reduce a resonance frequency of the ring patch;
- a bottom section to generate a desired radio frequency (RF) signal, the bottom section including:
  - a plurality of dielectric layers;
  - a ring slot supported by one of the plurality of dielectric layers;
  - an electrically conductive fence substantially surrounding the ring slot;
  - two electrical feed lines, wherein the electrical feed lines are 90-degrees out of phase; and
- a foam layer disposed between the top section and the bottom section, the foam layer to separate the ring patch from the ring slot.

2. The system of claim 1, wherein the bottom section further includes an embedded symmetric stripline RF distribution layer within an asymmetric stripline of the bottom section, wherein the embedded symmetric stripline RF distribution layer is to provide high signal isolation due to a physical separation of the top section and bottom section.

3. The system of claim 1, wherein, when in a transmit mode, the electrical feed lines are to couple energy into the ring slot, wherein the ring slot generates a desired RF signal in the ring patch.

4. The system of claim 1, wherein, when in a receipt mode, the ring patch is to generate electrical resonance in the ring slot, wherein the ring slot couples energy to the electrical feed lines.

5. The system of claim 1, wherein the electrically conductive fence is to shield the ring slot from an RF power distribution network and reduce unwanted mutual coupling with other ring slots in neighboring ring cells that are part of an array antenna.

6. The system of claim 5, wherein the electrically conductive fence is to comprise one or more metallic walls.

7. The system of claim 5, wherein the electrically conductive fence is to comprise a circular pattern of electrical vias.

8. The system of claim 1, wherein the electrical feed lines comprise a T-junction delay for supplying electrical feed.

9. The system of claim 1, wherein the electrical feed lines comprise a hybrid coupler for supplying electrical feed.

10. A method for providing a unit cell antenna for a periodic antenna array, the method comprising:
- providing a top section to communicate a radio frequency (RF) signal, the top section including:
  - a dielectric layer, and
  - a ring patch, wherein the ring patch is supported by the dielectric layer, the ring patch having a center cutout hole to reduce a resonance frequency of the ring patch;
- providing a bottom section to generate a desired radio frequency (RF) signal, the bottom section including:
  - a plurality of dielectric layers;
  - a ring slot supported by one of the plurality of dielectric layers;
  - an electrically conductive fence substantially surrounding the ring slot;
  - two electrical feed lines, wherein the electrical feed lines are 90-degrees out of phase; and
- providing a foam layer disposed between the top section and the bottom section, the foam layer to separate the ring patch from the ring slot.

11. The method of claim 10, wherein the bottom section further includes an embedded symmetric stripline RF distribution layer within an asymmetric stripline of the bottom section, wherein the embedded symmetric stripline RF distribution layer is to provide high signal isolation due to a physical separation of the top section and bottom section.

12. The method of claim 10, wherein, when in a transmit mode, the electrical feed lines are to couple energy into the ring slot, wherein the ring slot generates a desired RF signal in the ring patch.

13. The method of claim 10, wherein, when in a receipt mode, the ring patch is to generate electrical resonance in the ring slot, wherein the ring slot couples energy to the electrical feed lines.

14. The method of claim 10, wherein the electrically conductive fence is to shield the ring slot from an RF power distribution network and reduce unwanted mutual coupling with other ring slots in neighboring ring cells that are part of an array antenna.

15. The method of claim 14, wherein the electrically conductive fence is to comprise one or more metallic walls.

16. The method of claim 14, wherein the electrically conductive fence is to comprise a circular pattern of electrical vias.

17. The method of claim 10, wherein the ring patch is positioned below a dielectric layer and above the foam layer.

18. The method of claim 10, wherein the electrical feed lines comprise a T-junction delay for supplying electrical feed.

19. A method of fabricating a unit cell antenna system for a periodic antenna array, the method comprising:

forming a top section to communicate a radio frequency (RF) signal, the top section including:
- a dielectric layer, and
- a ring patch, wherein the ring patch is supported by the dielectric layer, the ring patch having a center cutout hole to reduce a resonance frequency of the ring patch;

forming a bottom section to generate a desired radio frequency (RF) signal, the bottom section including:
- a plurality of dielectric layers;
- a ring slot supported by one of the plurality of dielectric layers;
- an electrically conductive fence substantially surrounding the ring slot;
- two electrical feed lines, wherein the electrical feed lines are 90-degrees out of phase; and forming a foam layer disposed between the top section and the bottom section, the foam layer to separate the ring patch from the ring slot.

20. The method of claim 19, wherein the bottom section further includes an embedded symmetric stripline RF distribution layer within an asymmetric stripline of the bottom section, wherein the embedded symmetric stripline RF distribution layer is to provide high signal isolation due to a physical separation of the top section and bottom section.

* * * * *